United States Patent

Yumoto

[19]

[11] Patent Number: 5,852,330

[45] Date of Patent: Dec. 22, 1998

[54] VEHICLE ACCELERATION SLIP CONTROL SYSTEM

[75] Inventor: Daijiro Yumoto, Zama, Japan

[73] Assignee: Unisia Jecs Corporation, Atsugi, Japan

[21] Appl. No.: 699,852

[22] Filed: Aug. 20, 1996

[30] Foreign Application Priority Data

Aug. 23, 1995 [JP] Japan .................................. 7-214476

[51] Int. Cl.[6] .................................................. F02N 11/06
[52] U.S. Cl. .................. 290/40 R; 290/40 A; 290/40 B; 290/40 C; 290/40 D
[58] Field of Search .............................. 290/40 A, 40 B, 290/40 C, 40 D, 40 R; 180/76, 197; 364/426.01, 426.02, 426.03, 424.01

[56] References Cited

U.S. PATENT DOCUMENTS

| | | | |
|---|---|---|---|
| 4,685,547 | 8/1987 | Ohashi et al. | 192/3 R |
| 4,739,856 | 4/1988 | Inagaki et al. | 180/197 |
| 5,018,595 | 5/1991 | Hara et al. | 180/197 |
| 5,025,882 | 6/1991 | Ghoneim | 180/197 |
| 5,038,288 | 8/1991 | Moride et al. | 364/426.03 |
| 5,281,008 | 1/1994 | Kawamura et al. | 303/100 |
| 5,539,643 | 7/1996 | Yamamoto et al. | 364/426.03 |

FOREIGN PATENT DOCUMENTS 3-50354  7/1989  Japan .................................. 290/40 R

*Primary Examiner*—Thomas M. Dougherty
*Assistant Examiner*—Elvin G. Enad
*Attorney, Agent, or Firm*—Foley & Lardner

[57] ABSTRACT

In order to prevent an acceleration slip in an early stage of acceleration even in starting, an acceleration slip control system has a predicting section for predicting an acceleration slip of a drive wheel of a vehicle, a prediction control section for determining an initial value of a driving force reduction quantity and decreases the driving force by increasing the driving force reduction quantity to the initial value to prevent an occurrence of an acceleration slip when the acceleration slip is predicted, and a modifying section for modifying the initially set driving force reduction quantity in accordance with a sensed actual slipping condition during a prediction control of the prediction control section.

20 Claims, 21 Drawing Sheets

FIG.8

| THROTTLE OPENING DEGREE | TV0≦TV00 | TV00<TV0 ≦TV01 | TV01<TV0 ≦TV02 | TV0>TV02 |
|---|---|---|---|---|
| NUMBER OF FUEL CUT CYLINDERS TCSFF | 0 | A1 | A2 | A3 |
| SLIP QUANTITY SUMMATION LOWER LIMIT SLIPFF0 | | B1 | B2 | B3 |
| SLIP QUANTITY SUMMATION UPPER LIMIT SLIPFF1 | | C1 | C2 | C3 |

| THROTTLE OPENING DEGREE | TV0≦TV00 | TV00<TV0 ≦TV01 | TV01<TV0 ≦TV02 | TV0>TV02 |
|---|---|---|---|---|
| NUMBER OF FUEL CUT CYLINDERS TCSFF | 0 | A1 | A2 | A3 |

VEHICLE ACCELERATION SLIP CONTROL SYSTEM

BACKGROUND OF THE INVENTION

The present invention relates to a vehicle acceleration slip control system for preventing a drive wheel slippage during acceleration.

Japanese Patent Provisional Publication No. H3-50354 shows a conventional vehicle acceleration slip control system (in FIG. 1 of that reference).

This conventional system has a subordinate throttle valve in an air passage of an internal combustion engine in addition to a main throttle valve opening and closing in accordance with a depression of an accelerator pedal, and a traction controller for closing the subordinate throttle valve to a predetermined degree upon detection of an acceleration slip, and thereby reduce an excessive torque of the drive wheels by limiting the intake air quantity with the subordinate throttle valve. This conventional control system further includes a means for predicting an acceleration slip of the vehicle, and a standby control means for closing the subordinate throttle valve by a predetermined degree when the acceleration slip is predicted. The standby control means is arranged to calculate a desired subordinate throttle valve closing degree from a map for determining the closing degree substantially in proportion to the engine speed (rpm).

When an occurrence of an acceleration slip is predicted, this conventional control system reduces the engine driving torque by decreasing the opening degree of the sub-throttle valve by a predetermined amount, prior to an occurrence of an acceleration slip, and thereby restrains an excessive slip in an early stage of acceleration.

However, this control system is arranged to calculate the desired sub-throttle valve closing degree from the map in which the desired sub-throttle valve opening degree is substantially proportional to the engine speed. Therefore, the actual slip quantity occurring in accordance with the road surface friction coefficient $\mu$ is not reflected on the desired sub-throttle valve closing degree. As a result, when the engine speed becomes high, for example, due to slippage of a torque converter or a clutch, with no slippage of the drive wheels, this control system reduces the driving force by controlling the sub-throttle valve in the closing direction notwithstanding the nonexistence of a drive wheel slip, so that the vehicle acceleration response becomes poor.

When, on the other hand, the engine speed does not become high despite slippage of the drive wheels, this control system is unable to reduce the driving force by closing the sub-throttle valve, so that the restraint of the acceleration slip is deficient.

Because the disagreement between the driving force reduction determined by the standby control and the driving force reduction fit to the road surface friction coefficient $\mu$ is causative of the acceleration deficiency or the slip restraint deficiency, it is possible to solve the above-mentioned problems by estimating the road surface friction coefficient $\mu$ from the slip quantity of the drive wheels, and calculating the driving force reduction quantity of the standby control. However, in a situation, such as a vehicle starting operation, in which the standby control is needed, the estimation of the road surface friction coefficient $\mu$ is generally difficult. Furthermore, the estimation of the road surface friction coefficient $\mu$ after detection of an acceleration slip is too late. Therefore, the restraint of a slip is impossible in practice in an early stage of acceleration.

SUMMARY OF THE INVENTION

It is therefore an object of the present invention to provide a vehicle acceleration slip control system capable of sufficiently restraining an excessive slip in an initial stage of acceleration even in starting acceleration without causing acceleration deficiency or slip restraint deficiency.

A vehicle acceleration slip control system according to the present invention, as shown in FIG. 1, comprises: a means a for sensing a drive wheel speed of a vehicle; a means b for sensing a non-drive wheel speed of the vehicle; an acceleration slip condition detecting means c for detecting an actual drive wheel acceleration slip condition by comparing the drive wheel speed sensed by the drive wheel sensing means and the non-drive wheel speed sensed by the non-drive wheel speed sensing means; a driving force reducing means d for reducing a driving force in the vehicle; an acceleration slip controlling means e for sending a command signal indicating a driving force reduction quantity to the driving force reducing means to restrain an acceleration slip when an actual acceleration slip condition is detected by the acceleration slip detecting means; an acceleration slip predicting means f for predicting an occurrence of a drive wheel acceleration slip of the vehicle; a prediction acceleration slip controlling means g for performing a prediction control to prevent an occurrence of an acceleration slip by sending a command signal indicating an initial value of the driving force reduction quantity to said driving force reducing means when an occurrence of an acceleration slip is predicted by said predicting means; and a driving force reduction modifying means h for modifying said initial value of said driving force reduction quantity in accordance with the acceleration slip condition sensed by said acceleration slip detecting means during the prediction control of said prediction controlling means.

When the acceleration slip predicting means f predicts an occurrence of an acceleration slip of the drive wheels at a stage prior to an occurrence of an actual acceleration slip, the prediction acceleration slip controlling means g performs the prediction control to prevent an occurrence of an acceleration slip by sending the command signal indicating the drive force reduction quantity. By so doing, the control system can reliably restrain an excessive slip in an initial stage of acceleration even in acceleration during starting.

When, during the prediction control, the actual acceleration slip condition is detected by the acceleration slip detecting means c, the reduction modifying means h modifies the driving force reduction quantity from the initial value determined by the prediction acceleration slip controlling means g, in accordance with the actual acceleration slip condition of the drive wheels. By so doing, the control system can prevent acceleration deficiency, and slip restraint deficiency due to the road surface friction coefficient.

The control system according to the present invention may further comprise a means for sensing a throttle valve opening degree. The prediction acceleration slip controlling means may be arranged to determine the initial value of the driving force reduction quantity in accordance with the sensed throttle valve opening degree.

In this case, the driving force reduction quantity is determined in accordance with the throttle valve opening degree, independent of the engine speed, so that the control system can prevent acceleration deficiency and slip restraint deficiency.

The control system may be so arranged as to reduce the driving force reduction quantity from the initial value by a predetermined amount each time after the elapse of a predetermined time from a start of the prediction control of said prediction controlling means.

In this case, it is possible to prevent acceleration deficiency even though the driving force reduction quantity is initially set at a relatively great value, and therefore, the control system can enhance the effect of restraining an excessive slip in the initial acceleration stage.

The control system may be arranged so that the rate of decrease (or the decreasing speed) of the driving force reduction quantity from the initial value is variable in dependence on the actual acceleration slip condition of the drive wheels sensed by the acceleration slip condition detecting means. In this case, the control system can cause the drive wheel speed to converge to the target drive wheel speed without delay.

The acceleration slip predicting means f may comprise a throttle valve opening degree sensing means, a throttle valve opening speed sensing means, and a judging means for predicting an occurrence of an acceleration slip when the throttle valve opening degree is greater than a predetermined threshold opening degree and the throttle valve opening speed is greater than a predetermined opening speed.

The driving force reducing means d may be connected with at least one of a fuel supply system m, an ignition system n, a brake system o and a sub-throttle p provided on the downstream side of a main throttle valve, and arranged to decrease the vehicle driving force by cutting off the fuel supply to one or more cylinders of the engine, or by retarding the ignition timing of the engine, or by increasing the braking force applied to the drive wheels or by decreasing the opening degree of the sub-throttle valve.

BRIEF DESCRIPTION OF THE DRAWINGS

FIG. 8 is a table showing a map representing initial values of the number of cutoff cylinders corresponding to values of the throttle opening degree, used by the control system according to the first embodiment.

DETAILED DESCRIPTION OF THE INVENTION

Figure 1:
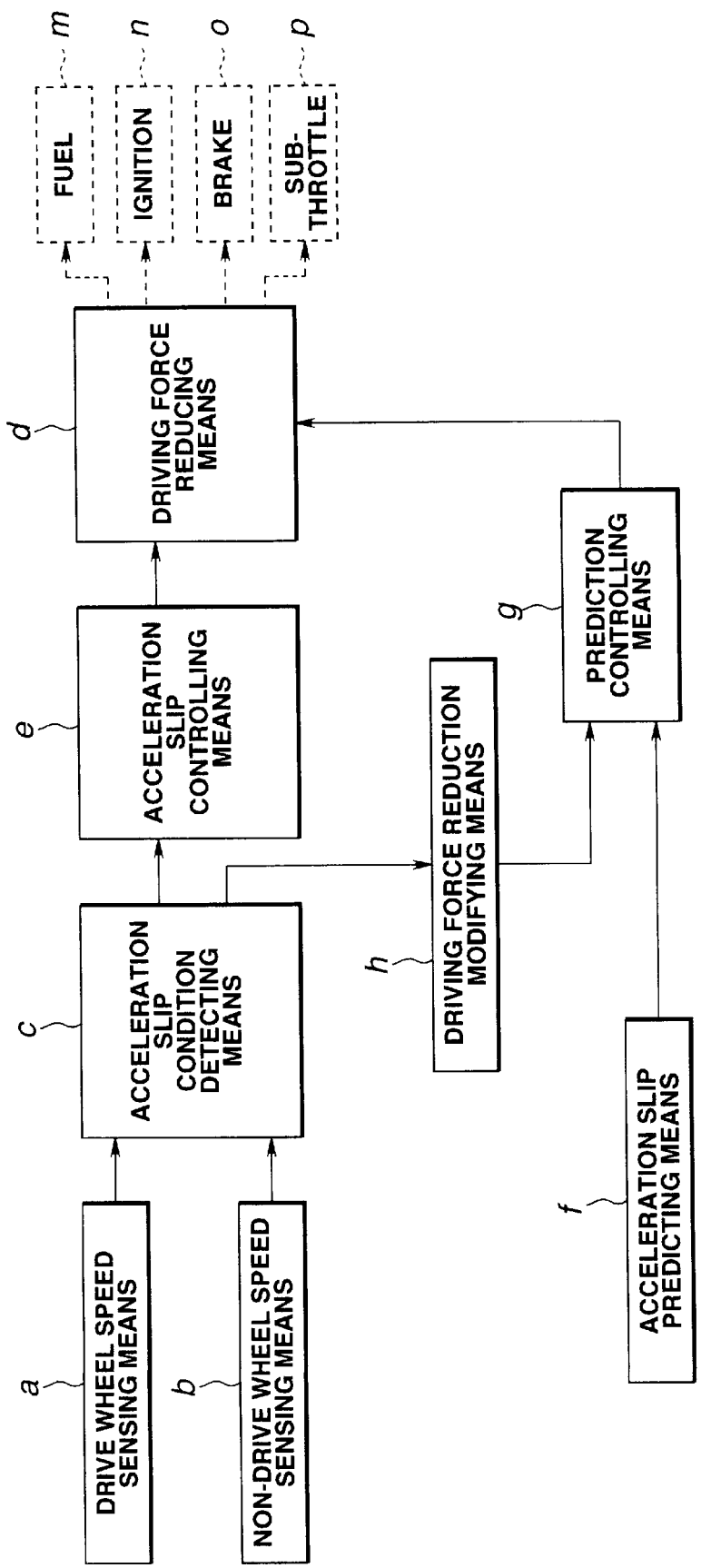
FIG. 1 is a block diagram showing an arrangement of various means which can be employed in the present invention.
Figure 2:
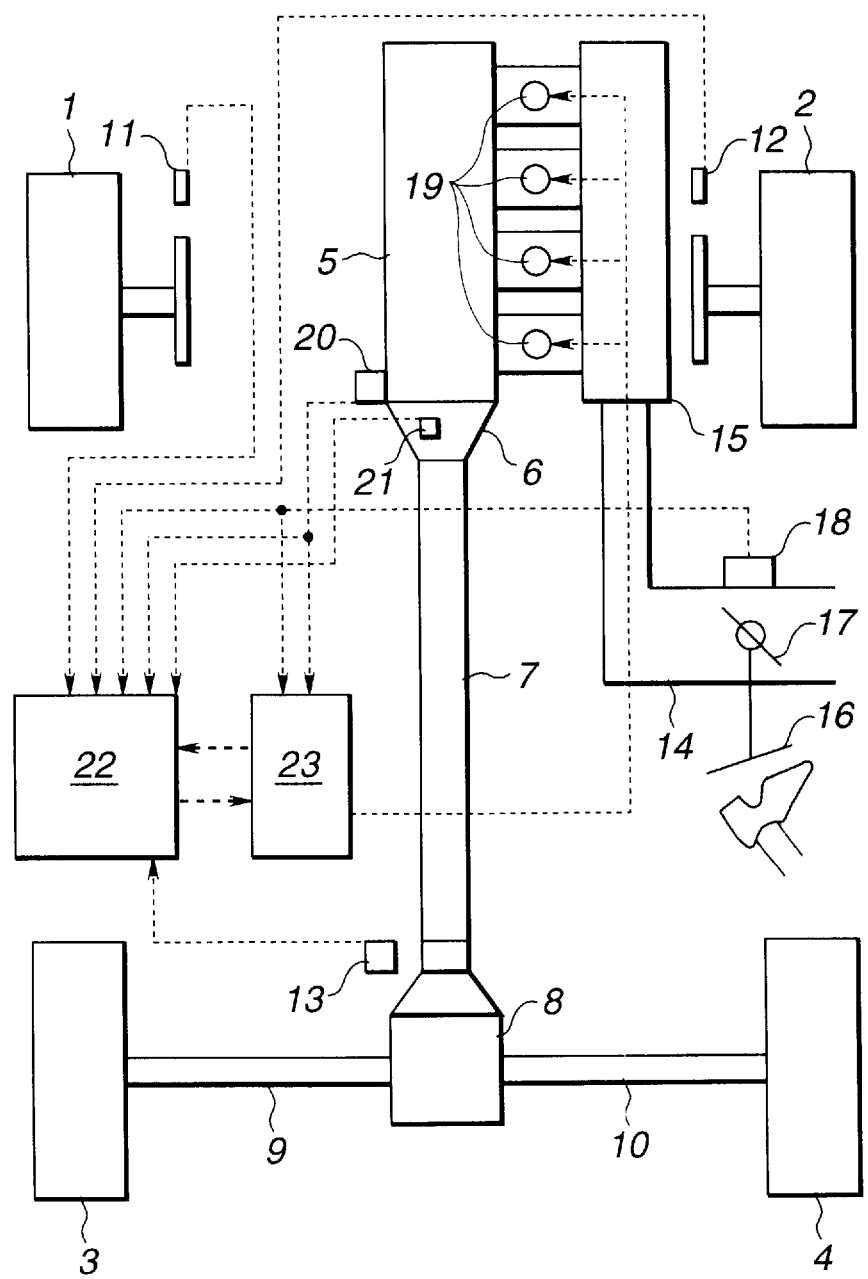
FIG. 2 is a schematic view showing a vehicle acceleration slip control system according to a first embodiment of the present invention.

FIG. 2 schematically shows a vehicle equipped with an acceleration slip control system according to a first embodiment of the present invention.

The vehicle has left and right front wheels 1 and 2, left and right rear wheels 3 and 4, and an engine 5. In this example, the front wheels 1 and 2 are non-drive wheels, and the rear wheels 3 and 4 are drive wheels, and the engine 5 is a 4 cylinder, 4 cycle engine. Rotation torque of the engine 5 is transmitted through a transmission 6, a propeller shaft 7, a differential unit 8, and left and right drive shafts 8 and 10, to the left and right rear wheels 3 and 4.

Wheel speed sensors 11 and 12 are provided for sensing wheel speeds VWFL and VWFR of the left and right front wheels 1 and 2, respectively. A wheel speed sensor 13 is arranged to sense a wheel speed VWRR of the left and right rear wheels 3 and 4 by sensing a rotational speed of the propeller shaft 7. In this example, each of the wheel speed sensors 11, 12 and 13 is an electromagnetic type rotation sensor using a pickup coil, and arranged to produce a frequency signal corresponding to the rotational speed of the rotating object, that is, the wheel 1 or 2 or the propeller shaft 7.

The engine 5 is supplied with air from an intake passage 14 through an intake manifold 15. An accelerator pedal 16 is connected with a throttle valve 17 in the intake passage. The driver of the vehicle can operate the accelerator pedal 16, and the throttle valve 17 controls the amount of intake air to the engine by varying its opening degree in accordance with the accelerator pedal position.

A throttle sensor (or throttle valve opening degree sensor) 18 senses the opening degree of the throttle valve 17. The throttle sensor 18 of this example has a rotor connected with the throttle valve 17 in an interlocking manner. With the rotor having a contact rotating and sliding on a resistor, the throttle sensor 18 produces an output voltage corresponding to the throttle valve opening degree.

Fuel injectors 19 are provided in the intake manifold 15, and arranged to inject fuel to the individual cylinders of the engine 5. Each cylinder is supplied with fuel by a respective one of the injectors 19.

An engine speed sensor 20 produces a pulse signal of a width corresponding to the rotational speed of the engine 5. A gear position sensor 21 senses a gear position of the transmission 6 and produces an electric signal representing the sensed condition of the transmission 6.

An acceleration slip control unit 22 shown in FIG. 2 is an electronic control unit comprising a microcomputer and one or more memories. The acceleration slip control unit 22 receives signals from the wheel speed sensors 11, 12 and 13, the throttle position sensor 18, the engine speed sensor 20 and the gear position sensor 21, and sends a control or command signal to an engine control unit 23. When the acceleration slip control unit 22 predicts or detects an acceleration slip of the drive wheels 3 and 4 from the wheel speed signals of the wheel speed sensors 11, 12 and 13, the acceleration slip control unit 22 calculates a fuel cutoff quantity (the number of fuel cut cylinders), and delivers the calculated fuel cutoff quantity to the engine control unit 23.

The engine control unit 23 receives signals from the throttle position sensor 18 and the engine speed sensor 20, and delivers a fuel injection control signal to each fuel injector 19. The engine control unit 23 is an electronic control unit comprising a microcomputer and one or more memories. The engine control unit 23 performs a fuel injection quantity control to each cylinder by using the injectors 19 in accordance with an intake air quantity per stroke calculated from the intake air quantity sensed by the throttle position sensor 18 and the engine rotational speed sensed by the engine speed sensor 20.

When a predetermined condition unsuitable for the fuel cut control is satisfied, the engine control unit 23 sends a fuel cut inhibit signal to the acceleration slip control unit 22. When the fuel cut inhibit signal is absent, and a fuel cut request from the acceleration slip control unit 22 is present, the engine control unit 23 decreases the driving force of the engine 5 by interrupting the fuel injection of one or more injectors 19 so that the number of the cylinder or cylinders to which the fuel injection is cut off corresponds to the fuel cutoff quantity.

Figure 3:
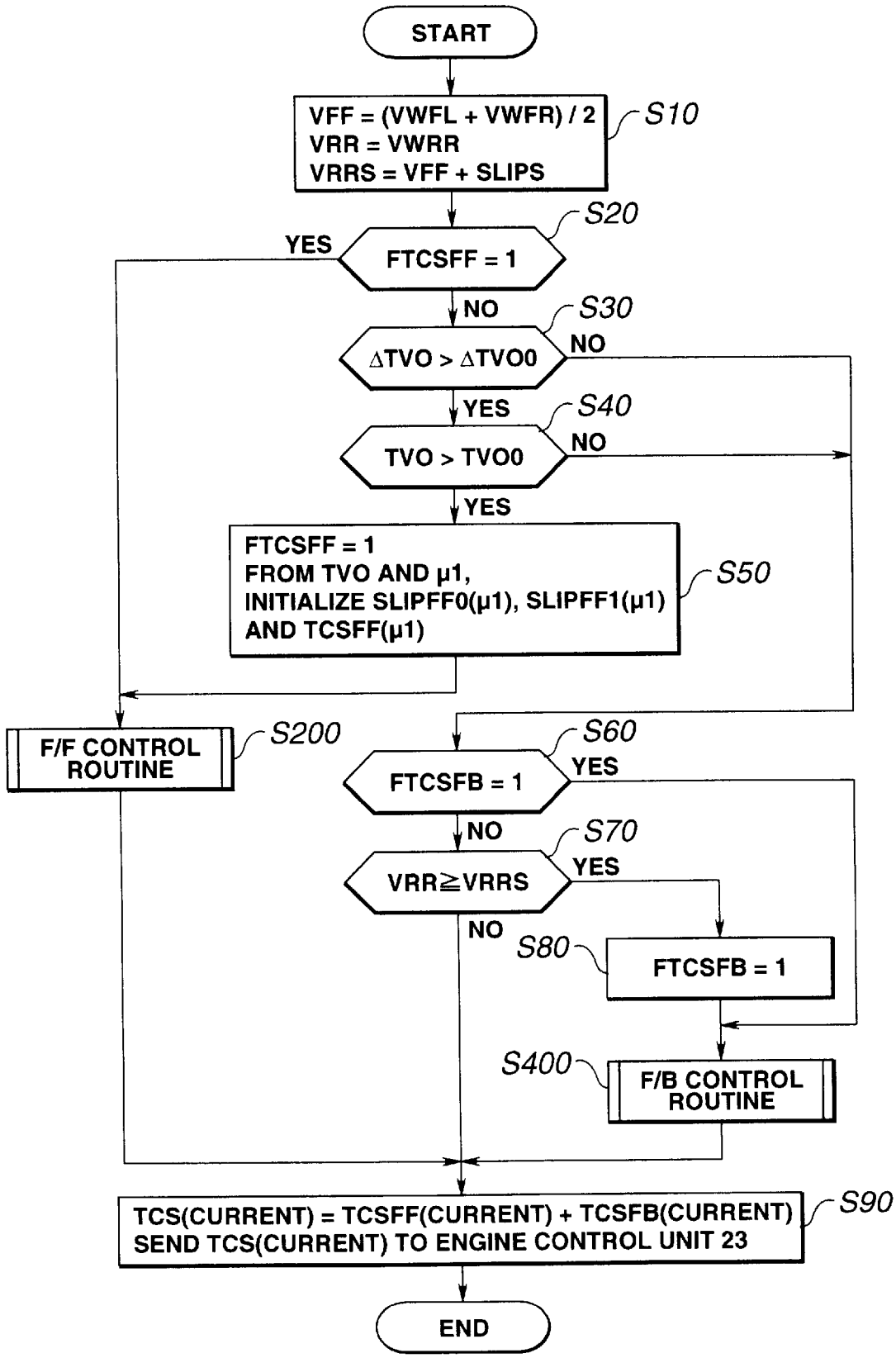
FIG. 3 is a flow chart showing a main control routine performed in the control system according to the first embodiment.
Figure 4:
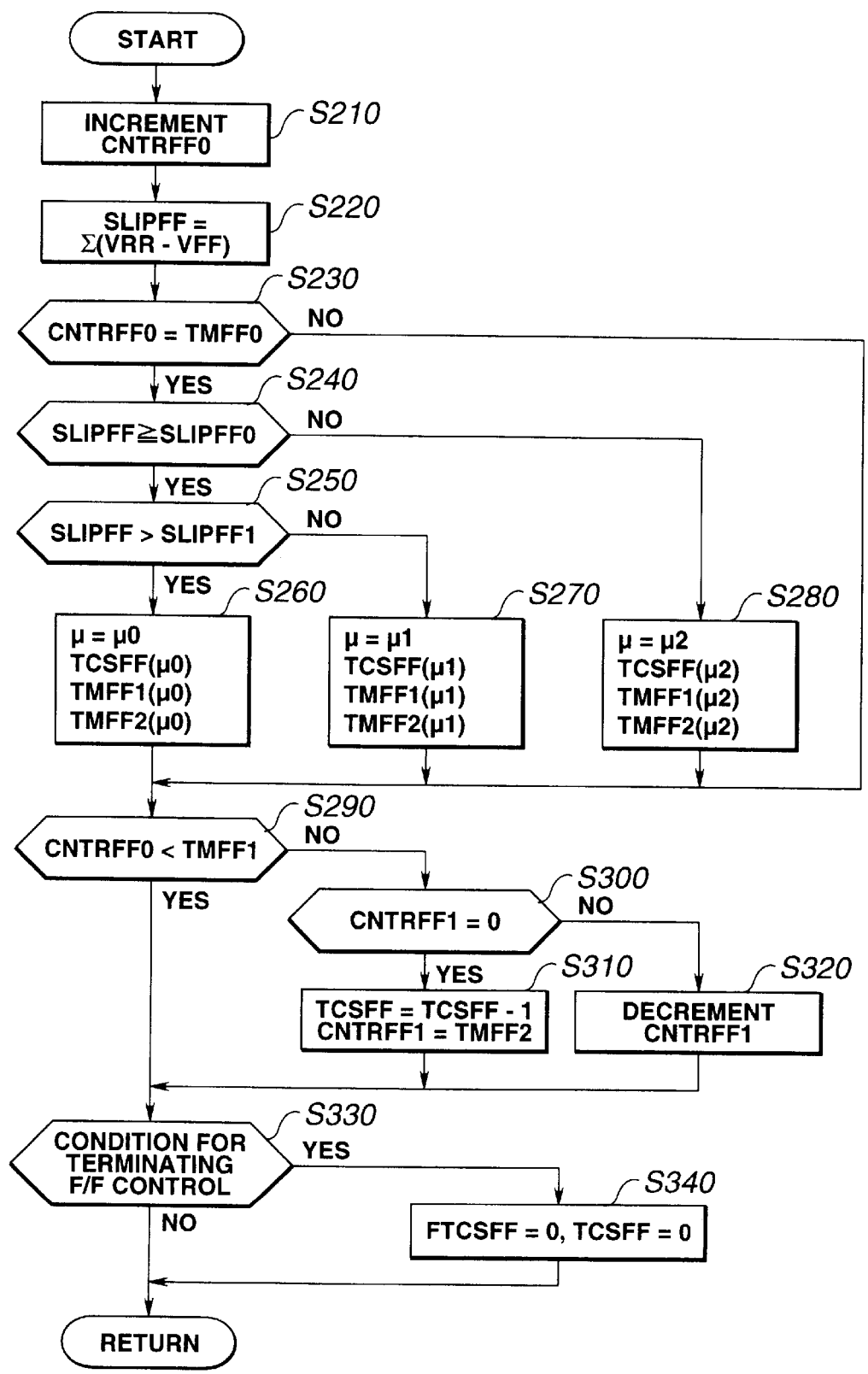
FIG. 4 is a flow chart showing an F/F control routine performed in the control system according to the first embodiment.
Figure 5:
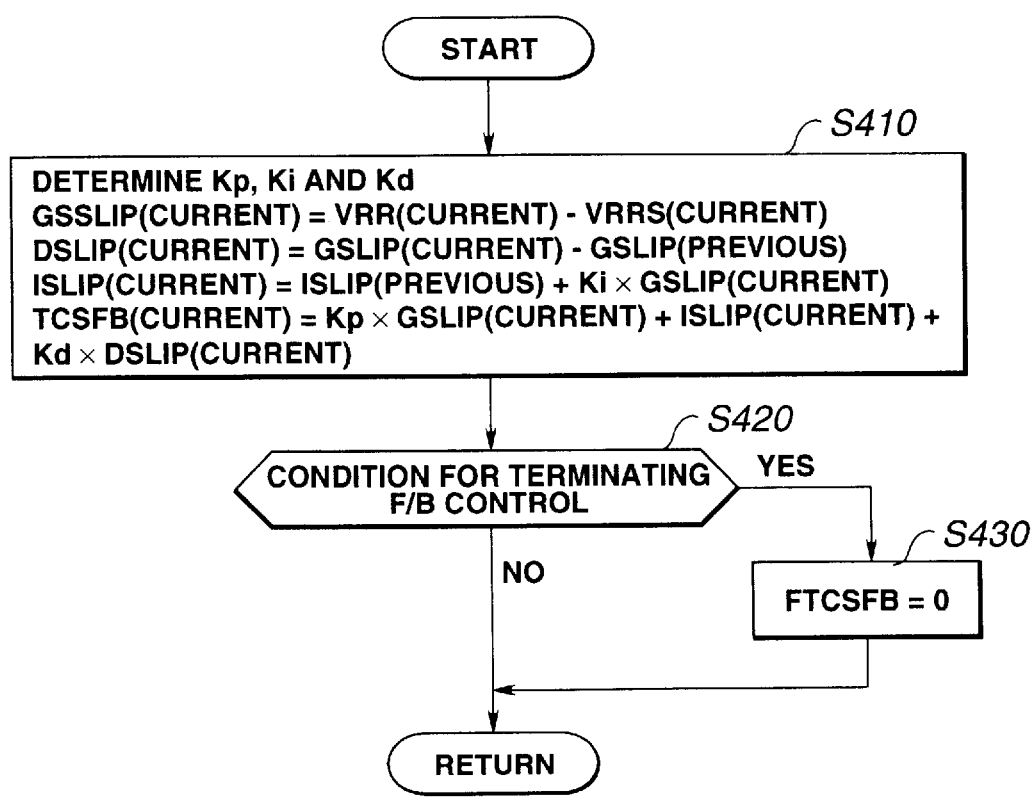
FIG. 5 is a flow chart showing an F/B control routine performed in the control system according to the first embodiment.

FIGS. 3, 4 and 5 show control procedures performed by the acceleration control unit 22 and the engine control unit 23. When the control system is started, the following operations are first performed prior to the first step of the main control routine shown in FIG. 3.

The front (non-drive) wheel speeds VWFL and VWFR and the rear wheel speed VWRR are determined by a known method for measuring the periods of the wheel speed frequency signals from the wheel speed sensors 11, 12 and 13. The throttle opening degree TVO is determined by a known method for converting the voltage signal from the throttle position sensor 18 to numerical data and storing the data in the memory. Furthermore, in an initializing operation, the control system resets, to zero, both of a first counter CNTRFF0 for measuring time from the beginning of a feed forward control (F/F control) and a second counter CNTRFF1 for indicating a duration of the F/F control, that is an elapsed time after a duration TMFF1.

At a step S10 in the main control routine shown in FIG. 3, the control system determines an average of the left and right front wheel speeds VWFL and VWFR as expressed by an equation (1) below, and sets this average as a non-drive wheel speed VFF, and the wheel speed VWRR of the rear wheels 3 and 4 as a drive wheel speed VRR. It is optional to perform a usual filtering operation on the VWFL, VWFR and VWRR to remove noises before the calculation of the non-drive wheel speed VFF and the drive wheel speed VRR which are basic quantities to determine the control quantity.

$$VFF = (VWFL + VWFR) \div 2 \tag{1}$$

Then, the control system determines a target drive wheel speed VRRS by adding a predetermined slip threshold SLIPS to the non-drive wheel speed VFF, as expressed by an equation (2).

$$VRRS = VFF + SLIPS \tag{2}$$

The slip threshold SLIPS is a positive constant in this example. However, it is optional to make the threshold SLIPS a variable varying in dependence on a steady state acceleration slip quantity of the drive wheels and/or a quantity of operation of the accelerator pedal so that the accelerating slip condition and/or the driver's intention of acceleration are reflected on the slip threshold SLIPS.

At a step S20 following the step S10, the control system determines whether an acceleration slip prediction flag FTCSFF is set at 1 or not, that is whether an occurrence of an acceleration slip of the drive wheels has been predicted. If the answer is YES (FTCSFF=1), then the control system proceeds to a feed forward control (F/F control) routine in a step S200. If the answer of the step S20 is NO (FTCSFF=0), then the control system proceeds from the step S20 to a step S30. In the step S200, the control system performs the feed forward control routine shown in FIG. 4, as explained later. After the step S200, the control system proceeds to a step S90.

At the step S30 following the step S20, the control system predicts an occurrence of an acceleration slip from a throttle valve opening speed $\Delta$TVO by determining whether the throttle valve opening speed $\Delta$TVO is equal to or greater than a predetermined threshold opening speed $\Delta$TVO0. If $\Delta$TVO is equal to or greater than $\Delta$TVO0 ($\Delta$TVO$\geq$$\Delta$TVO0), then the control system considers that a driver's operation on the accelerator pedal 16 is sharp, and the possibility of acceleration slip is sufficiently high, and proceeds to a step S40. If $\Delta$TVO is smaller than $\Delta$TVO0 ($\Delta$TVO<$\Delta$TVO0), then control system considers that the operation on the accelerator pedal 16 is gradual and the possibility of acceleration slip is low, and proceeds to the step S60.

The throttle valve opening speed $\Delta$TVO is determined, in this example, by subtracting a 3-cycle-old throttle opening degree TVO(k3) from a current throttle opening degree TVO(k), as expressed by an equation (3).

$$\Delta TVO = TVO(k) - TVO(k-3) \tag{3}$$

When k=1~3, $\Delta$TVO=0. The comparison of the current value TVO(k), with the three-cycle-old value TVO(k−3) which was obtained three control cycles before, can clarify a change in the opening degree.

The step S40 is for checking the throttle valve opening degree TVO to confirm the affirmative answer of the step S30 that the possibility of acceleration slip is sufficiently high. At the step S40, the control system determines whether the throttle valve opening degree TVO is equal to or greater than a predetermined threshold opening degree TVO0, or not. If the answer is YES (TVO>TVO0), then the control system considers that the depression degree of the accelerator pedal 16 is so great that the possibility of acceleration slip is very high and proceeds to a step S50. If the throttle valve opening degree TVO is smaller than the predetermined degree TVO0 (TVO<TVO0), then the control system proceeds to a step S60, considering that the depression degree of the accelerator pedal 16 is so small that there is no danger of acceleration slip.

At the step S50, the control system sets an acceleration slip prediction flag FTCSFF to one, and sets variables (TCSFF, SLIPFF0 and SLIPFF1) of the F/F control by using the throttle valve opening degree TVO and an initially set road surface friction coefficient $\mu=\mu 1$. When an occurrence of acceleration slip is predicted, the acceleration slip prediction flag FTCSFF is thus set to one so that, from the next control cycle, the step S200 of the F/F control routine is reached directly after the steps S10 and S20 without entering the acceleration slip prediction section of the steps S30, S40 and S50. In this example, the variables for the F/F control determined at the step S50 are a number of cutoff cylinders TCSFF, a lower limit SLIPFF0 of a slip quantity summation SLIPFF and an upper limit SLIPFF1 of the slip quantity summation SLIPFF. As shown in FIG. 8, the number of cutoff cylinders TCSFF (0~A3), the slip quantity summation lower limit SLIPFF0 (B1~B3) and the slip quantity summation upper limit SLIPFF1 (C1~C3) are preliminarily determined in dependence on the throttle valve opening degree TVO on the basis of experiments. Then, the control system proceeds from the step S50 to the step S200, and then from the step S200 to the step S90.

At the step S60, the control system determines whether an acceleration slip condition of the drive wheels is detected or not by checking whether an acceleration slip detection flag FTCSFB is set to one or not. If an acceleration slip condition has been detected (FTCSFB=1), then the control system proceeds to a step S400 of a feed back (F/B) control routine for controlling the wheel speeds by a feedback control which, in this example, is a proportional-plus-integral-plus-derivative control. If FTCSFB=0, then the control system proceeds to a step S70.

At the step S70, the control system determines whether the drive wheel speed VRR is equal to or higher than the target drive wheel speed VRRS, to judge whether the drive wheels are in an acceleration slip condition or not. If the drive wheel speed VRR is equal to or higher than the target drive wheel speed VRRS (VRR≧VRRS), then the control system proceeds to a step S80 and sets the acceleration slip detection flag FTCSFB to one in order to omit the step S70 from the next control cycle and to proceed to the step S400 directly from the step S60. Then, the control system proceeds from the step S80 to the step S400 of the feed back control routine. If the answer of the step S70 is NO (VRR<VRRS), then, the control system proceeds from the step S70 to the step S90.

At the step S90, the control system determines a fuel cut quantity TCS (current) by adding the number TCSFF (current) of cut off cylinders for the F/F control and the number TCSFB (current) of cut off cylinders for the F/B control, and sends the fuel cut quantity TCS which is the sum of TCSFF and TCSFB, to the engine control unit 23. Under the command of the acceleration slip control unit 22, the engine control unit 23 interrupts the fuel injection of one or more fuel injectors 19 to the number equal to the number of cut off cylinders TCSFF, and by so doing, decreases the driving force of the engine 5 to prevent the acceleration slip.

In this way, the control system completes one control flow. Thereafter, the control system repeats the control flow shown in FIG. 3.

FIG. 4 shows the F/F control routine of the step S200.

At a step S210 shown in FIG. 4, the control system increments (i.e. increases by one) a first counter CNTRFF0 (initial value=0) each control cycle. The first counter CNTRFF0 is for controlling time from the start of the F/F control.

At a step S220, the control system calculates a slip quantity sum SLIPFF (current) by adding up a difference ΔSLIPFF between the drive wheel speed VRR and the non-drive wheel speed VFF each cycle. That is, SLIPFF (current)=SLIPFF (previous)+ΔSLIPFF. By this summation, the control system can avoid a misjudgment when the slip quantity changes momentarily.

$$SLIPFF = \Sigma (VRR - VFF) \qquad (4)$$

At a step S230, the control system checks the first counter CNTRFF0 to determine whether a predetermined time TMFF0 from the start of the F/F control to estimation of a road surface friction coefficient $\mu$ has elapsed, or not. If the answer of the step S230 is YES (CNTRFF0=TMFF0), then the control system proceeds to a step S240 to start the estimation of the road surface friction coefficient $\mu$. If the answer of the step S230 is NO (CNTRFF0<TMFF0), then the control system proceeds to a step S290, bypassing the friction coefficient estimation section (S240~S280).

The summation of the speed difference between the non-drive wheel speed VFF and the drive wheel speed VRR increases as the road surface friction coefficient $\mu$ becomes lower. Therefore, the friction coefficient estimation section of the steps S240~S280 is arranged to estimate the actual friction coefficient $\mu$ of the road surface under the vehicle from the actual slip quantity sum SLIPFF. In this example, the control system estimates the friction coefficient $\mu$ by comparing the actual slip quantity sum SLIPFF with the upper and lower limits SLIPFF1 and SLIPFF0 in the following manner.

At the step S240, the control system compares the slip quantity sum SLIPFF with the predetermined lower limit SLIPFF0 of the slip quantity summation and determines whether SLIPPFF is equal to or greater than SLIPFF0 or not. If it is (SLIPFF≧SLIPFF0), then the control system proceeds to the step S250. If it is not (SLIPFF<SLIPFF0), then the control system proceeds to the step S280 and sets the estimated friction coefficient to $\mu 2$ (which is greater than $\mu 1$), estimating that the actual friction coefficient $\mu$ is high, and the acceleration is poor with the initial value $\mu 1$.

At the step S250, the control system determines whether the slip quantity sum SLIPFF is greater than the upper limit SLIPFF1 of the slip quantity summation. If it is (SLIPFF>SLIPFF1), then the control system proceeds to the step S260 and sets the estimated friction coefficient $\mu$ to $\mu 0$ (which is smaller than $\mu 1$), estimating that the actual friction coefficient $\mu$ is low, and the restraint of the acceleration slip is insufficient with the initial value $\mu 1$. If it is not (SLIPFF0≦SLIPFF≦SLIPFF1), then the control system estimates that the initial friction coefficient $\mu 1$ is proper for the actual friction coefficient $\mu$, and sets the estimated friction coefficient to $\mu 1$ at the step S270.

At each of the steps S260, S270 and S280, the control system determines the number of cut off cylinders TCSFF, a duration TMFF1 of the cutoff number TCSFF (the time from the start of the F/F control to the start of subtraction of the cut off number TCSFF), and an interval TMFF2 of the subtraction of the cutoff number TCSFF in accordance with the estimated friction coefficient ($\mu 0$ or $\mu 1$ or $\mu 2$). Thereafter, the control system proceeds to the step S290.

Thus, the control system increases the cut off number TCSFF, the duration TMFF1 and the subtraction interval TMFF2 when the estimated friction coefficient $\mu$ is low, and decreases the cut off number TCSFF, the duration TMFF1 and the subtraction interval TMFF2 when the estimated friction coefficient $\mu$ is high. In this way, the control system can reduce the driving force. properly in accordance with the estimated friction coefficient $\mu$.

At the step S290, the control system checks the first counter CNTRFF0, and determines whether the elapsed time from the start of the F/F control is smaller than the duration TMFF1. If the elapsed time is smaller than TMFF1 (CNTRFF0<TMFF1), then the control system proceeds to a step S330. If the elapsed time CNTRFF0 is equal to or greater than TMFF1 (CNTRFF0≧TMFF1), then the control system proceeds to a step S300.

The step S300 is to check a second counter CNTRFF1 for indicating a time after the elapse of the duration time TMFF1 in order to decrease the cut off number TCSFF by one at regular intervals of the subtraction interval time TMFF2. At the step S300, the control system determines whether the second counter CNTRFF1 is in the initial state indicating zero. If it is (CNTRFF1=0), then the control system proceeds to a step S310, at which the control system decreases the cut off number TCSFF by one (TCSFF (current)=TCSFF(previous)−1 (cylinder)), and sets the second counter CNTRFF1 to the subtraction interval time TMFF2 determined in one of the steps S260, S270 and S280. After the step S310, the control system proceeds to the step S330. If this is not the first time (CNTRFF1≧1), then the control system proceeds to a step S320, and decrements the second counter CNTRFF1 each control cycle (CNTRFF1 (current)=CNTRFF1 (previous)−1). After the step S320, the control system proceeds to the step S330.

At the step S330, the control system determines whether at least one of the following conditions for terminating the F/F control is satisfied.

(i) The time from the start of the F/F control has reached an upper limit time TMFF3 of the F/F control time (CNTRFF0≧TMFF3).

(ii) The cutoff number TCSFF (current) has been reduced to zero by subtraction of the step S310.

If either or both of the above-mentioned conditions to terminates the F/F control is satisfied, then the control system proceeds to a step S340, sets the acceleration slip prediction flag FTCSFF and the cutoff number TCSFF to zero at the step S340 to enable a new prediction of the acceleration slip from the next control cycle, and then returns to the step S10 of the main control routine shown in FIG. 3. If the answer of the step S330 is negative (NO), then the control system directly returns to the step S10 of the main control routine of FIG. 3.

FIG. 5 shows the F/B control routine of the step S400.

At a step S410 shown in FIG. 5, the control system determines the number TCSFB of fuel cut off cylinders for the F/B control according to a general proportional-plus-integral-plus-derivative control law.

Namely, the control system determines a proportional gain Kp, an integral gain Ki, and a derivative gain Kd from the existing value of the friction coefficient $\mu$ ($\mu$0 ~$\mu$2), and then calculates a deviation GSLIP of the drive wheel speed VRR from the target drive wheel speed VRRS, a deviation difference DSLIP and a deviation integral ISLIP according to the following equations (5), (6) and (7).

$$GSLIP(\text{current})=VRR(\text{current})-VRRS(\text{current}) \quad (5)$$

$$DSLIP(\text{current})=GSLIP(\text{current})-GSLIP(\text{previous}) \quad (6)$$

$$ISLIP(\text{current})=ISLIP(\text{previous})+K1\times GSLIP(\text{current}) \quad (7)$$

Then, the control system determines the cutoff number TCSFB according to the following equation (8) of the proportional-plus-integral-plus-derivative control.

$$TCSFB(\text{current})=Kp\times GSLIP(\text{current})+ISLIP(\text{current})+Kd\times DSLIP(\text{current}) \quad (8)$$

At a step S420 following the step S410, the control system determines whether the F/B control is over or not. In this example, the control system determines, at the step S420, whether, after an change from the state in which the cutoff number TCSFB(previous) ≠0 to the state in which the TCSFB(current)=0, and the state remains unchanged for a predetermined time. If the answer of the step S420 is YES, the control system considers the F/B control is over, proceeds to the step S430, resets the acceleration slip detection flag FTCFB to zero at the step S430, and returns to the step S10 of the main control routing shown in FIG. 3. In the case of NO, the control system directly returns to the step 510 of the main control routine.

Figure 6:
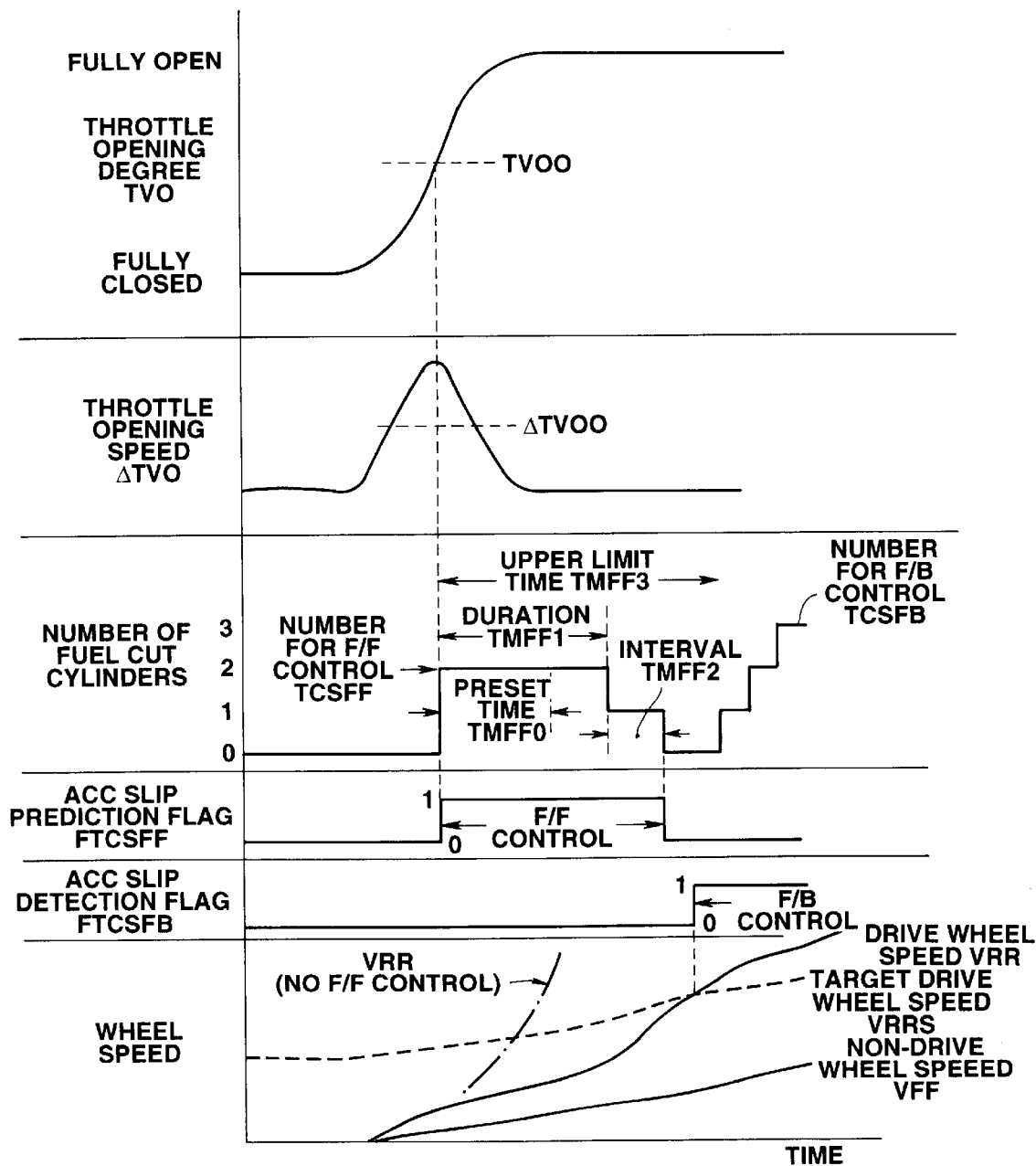
FIG. 6 is a time chart showing control operations of the control system according to the first embodiment.
Figure 7:
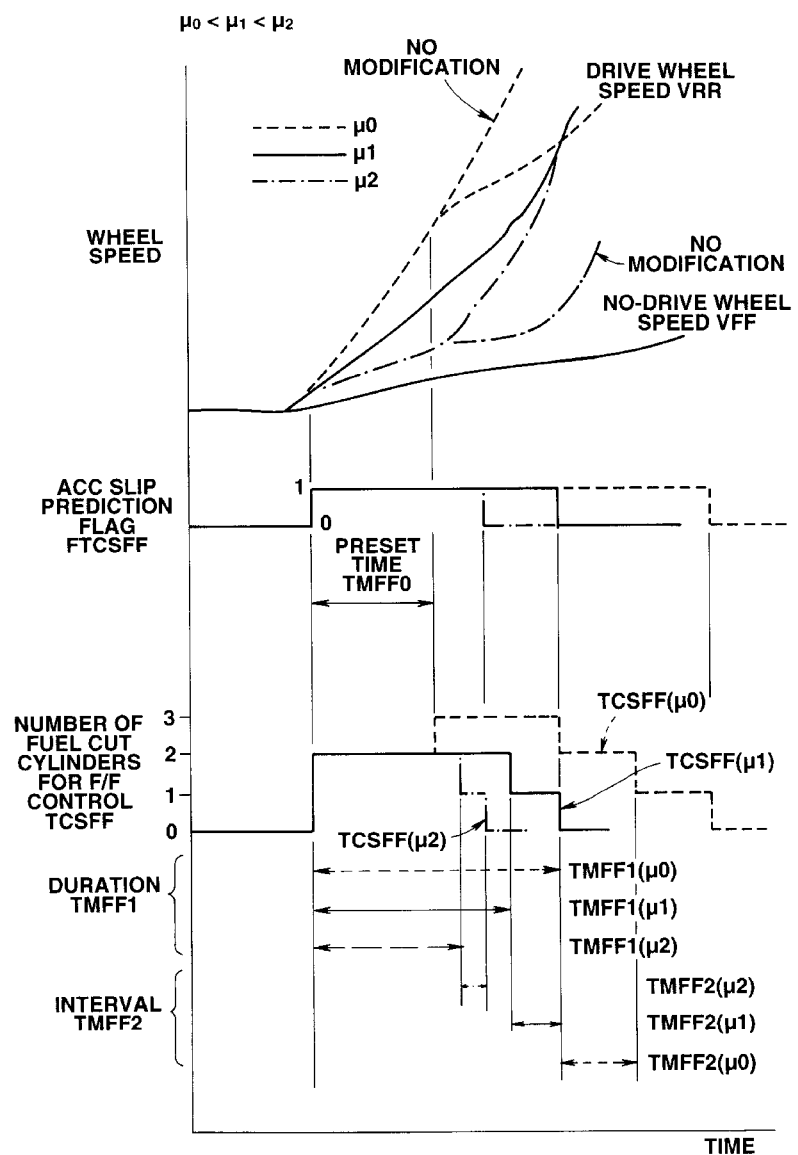
FIG. 7 is a time chart showing operations of the control system according to the first embodiment to modify the driving force reduction quantity.

The acceleration slip. control unit 22 and the engine control unit 23 perform control operations as shown in FIGS. 6 and 7.

(a) Prediction of acceleration slip

Even though, as shown in FIG. 6, the drive wheel speed VRR is lower than the target drive wheel speed VRRS, there is a danger of an acceleration slip of the left and right rear wheels 3 and 4 if the throttle valve opening speed ΔTVO is equal to or higher than the predetermined threshold speed ΔTVO0, and the throttle valve opening degree TVO is equal to or greater than the predetermined threshold degree TVO0. In this case, therefore, the F/F control (prediction control) is started to preliminarily reduce the driving force of the engine 5 before an actual occurrence of an acceleration slip, and at the same time, the acceleration prediction flag FTCSFF is set to one, as shown in FIG. 6.

In the F/F control, in accordance with the initially set road surface friction coefficient $\mu=\mu 1$, and the throttle valve opening degree TVO, the cutoff numbers TCSFF (0~A3), the slip quantity summation lower limit SLIPFF0 (B1~B3) and the slip quantity summation upper limit SLIPFF1 (C1~C3) are determined by using the experimentally determined values.

Then, under the command of the acceleration slip control unit 22, the engine control unit 23 preliminarily reduces the driving force of the engine 5 by interrupting the fuel injection to one or more cylinders of the engine so that the number of cylinders to which the fuel injection is interrupted is equal to the initially set cutoff number TCSFF (which, in the example shown in FIG. 6, is 2). In this way, the control system can prevent an acceleration flip safely. Without this F/F control, the drive wheel speed VRR changes sharply as shown by a one dot chain line in FIG. 6. Variations of the drive wheel speed VRR and the non-drive wheel speed VFF controlled by this control system are shown by solid lines in FIG. 6. By contrast to the sharp change of the one dot chain line, the drive wheel speed VRR shown by the solid line increases gradually, and the difference of the drive wheel speed VRR from the non-drive wheel speed VFF increases gradually.

When the predetermined time TMFF0 has passed since the start of the F/F control, the control system calculates the actual slip quantity sum SLIPFF from the non-drive wheel speed VFF and the drive wheel speed VRR, and estimates the road surface friction coefficient $\mu$ from the slip quantity sum SLIPFF. In accordance with the thus estimated friction coefficient $\mu$, the control system modifies the initially set cutoff number TCSFF, and determines the duration time TMFF1 and the subtraction interval time TMFF2.

Thus, the control system modifies the initially set cutoff number TCSFF in accordance with the friction coefficient $\mu$ ($\mu 0 \sim \mu 2$) estimated from the actual slip quantity summation SLIPFF at the end of the predetermined time TMFF0, decreases the cutoff number TCSFF by one at the end of the duration time TMFF1, and thereafter decreases the cutoff number TCSFF by one each time the subtraction interval time TMFF2 has elapsed. The control system varies the times TMFF1 and TMFF2 in dependence on the friction coefficient $\mu$ ($\mu 0 \sim \mu 2$) determined from the actual slip quantity summation SLIPFF, as shown in FIG. 7, and by so doing, modifies the driving force reduction quantity to a value suitable to the actual friction coefficient $\mu$.

FIG. 7 shows how the control system modifies the driving force reduction quantity.

When the actual road surface coefficient $\mu$ is low and accordingly the friction coefficient $\mu$ estimated from the actual slip quantity summation SLIPFF is lower than the initially set friction coefficient $\mu 1$, the cutoff number TCSFF ($\mu 1$) (two cylinders), the duration TMFF1($\mu 1$) and the interval TMFF2($\mu 1$) determined from the initial friction coefficient $\mu 1$ and shown by solid lines in FIG. 7 are inappropriate and the restraint of the acceleration slip is insufficient as shown by a broken line of the drive wheel speed. In this case, therefore, this control system modifies the estimated friction coefficient to $\mu 0$, and accordingly, increases the cutoff number TCSFF (to three cylinders), the duration TMFF1 and the interval TMFF2, as shown by broken lines in FIG. 7, so that the deficiency of restraining the acceleration slip is eliminated.

When, on the other hand, the actual road surface coefficient $\mu$ is high and accordingly the friction coefficient $\mu$ estimated from the actual slip quantity summation SLIPFF is higher than the initially set friction coefficient $\mu 1$, the cutoff number TCSFF($\mu 1$) (two cylinders), the duration TMFF1($\mu 1$) and the interval TMFF2($\mu 1$) determined from the initial friction coefficient $\mu 1$ and shown by solid lines in FIG. 7 are inappropriate and the acceleration is poor as shown by a one dot chain line of the drive wheel speed. In this case, therefore, this control system modifies the estimated friction coefficient to $\mu 2$, and accordingly, decreases the cutoff number TCSFF, the duration TMFF1 and the interval TMFF2, as shown by broken lines in FIG. 7, so that the deficiency of the acceleration is eliminated. In this way, this control system estimates the actual friction coefficient of the road surface on which the vehicle is running, by using the summation of the speed difference between the non-drive wheel speed VFF and the drive wheel speed VRR, and modifies the driving force reduction quantity in accordance with the estimated friction coefficient $\mu$. Therefore, this control system can reliably restrain an excessive slip in an early stage of an acceleration even in starting without causing poor acceleration or deficiency in restraining the acceleration slip. The summation of the speed difference between the non-drive wheel speed VFF and the drive wheel speed VRR is indicated by an area defined by curves of the wheel speed shown in FIG. 7 over a predetermined time.

This control system terminates the F/F control when the time from the start of the F/F control reaches the upper limit time TMFF3 (CNTRFF0≧TMFF3) or the cutoff number TCSFF(current) is reduced to zero. At the end of the F/F control, the control system resets the acceleration slip prediction flag FTCSFF and the cutoff number TCSFF to zero as shown in FIG. 6.

(b) Detection of acceleration slip

When the drive wheel speed VRR becomes equal to or greater than the target drive wheel speed VRRS, the left and right drive wheels 3 and 4 are in the acceleration slip condition, and therefore the control system sets the acceleration slip detection flag FTCSFB to one, and starts the F/B control. In the F/B control of this example, the control system calculates the cutoff number TCSFB according to a PID control law (as expressed by the equation (8)).

In response to the command signal from the acceleration slip control unit 22, the engine control unit 23 causes one or more fuel injectors the number of which is equal to the cutoff number TCSFB, to stop the fuel injection, and thereby reduce the engine driving force to prevent the acceleration slip.

Thereafter, the control system determines whether to terminate the F/B control. Thus, the control system terminates the F/B control when the cutoff number TCSFB has changed from a non-zero value to zero, and thereafter that state has continued for a predetermined time period, and resets the acceleration slip detection flag FTCSFB to zero.

The control system according to the first embodiment of the present invention can offer the following effects.

(i) In the F/F control (prediction control), the control system determines the initial value of the cutoff number TCSFF in dependence on the throttle valve opening degree TVO, without regard to the engine speed. Therefore, the control system can prevent an excessive slip sufficiently in an early acceleration stage even in an starting operation of the vehicle, without causing a deficiency of acceleration and without causing a deficiency in restraint of the acceleration slip.

(ii) After the elapse of the predetermined time TMFF0 from the start of the prediction control, the control system decreases the driving force reduction quantity in the form of the cutoff number TCSFF from the initially set value, stepwise by a predetermined amount each time. Therefore, even if the initial value of the cutoff number TCSFF is relatively large, the control system can prevent a deficiency in acceleration, and accordingly increase the effect of restraining an excessive slip in the early acceleration stage.

(iii) After the elapse of the predetermined time TMFF0 from the start of the F/F control, the control system modifies the driving force reduction quantity (such as the cutoff number TCSFF, the duration TMFF1 and the interval TMFF2) to a value suited to the actual road surface friction coefficient $\mu$. Therefore, without causing a deficiency in acceleration or a deficiency in restraint of an acceleration slip, the control system can restrain an excessive slip sufficiently in an early stage of acceleration even in an acceleration from a rest, and causes the drive wheel speed VRR to smoothly settle down to the target drive wheel speed VRRS.

Figure 9:
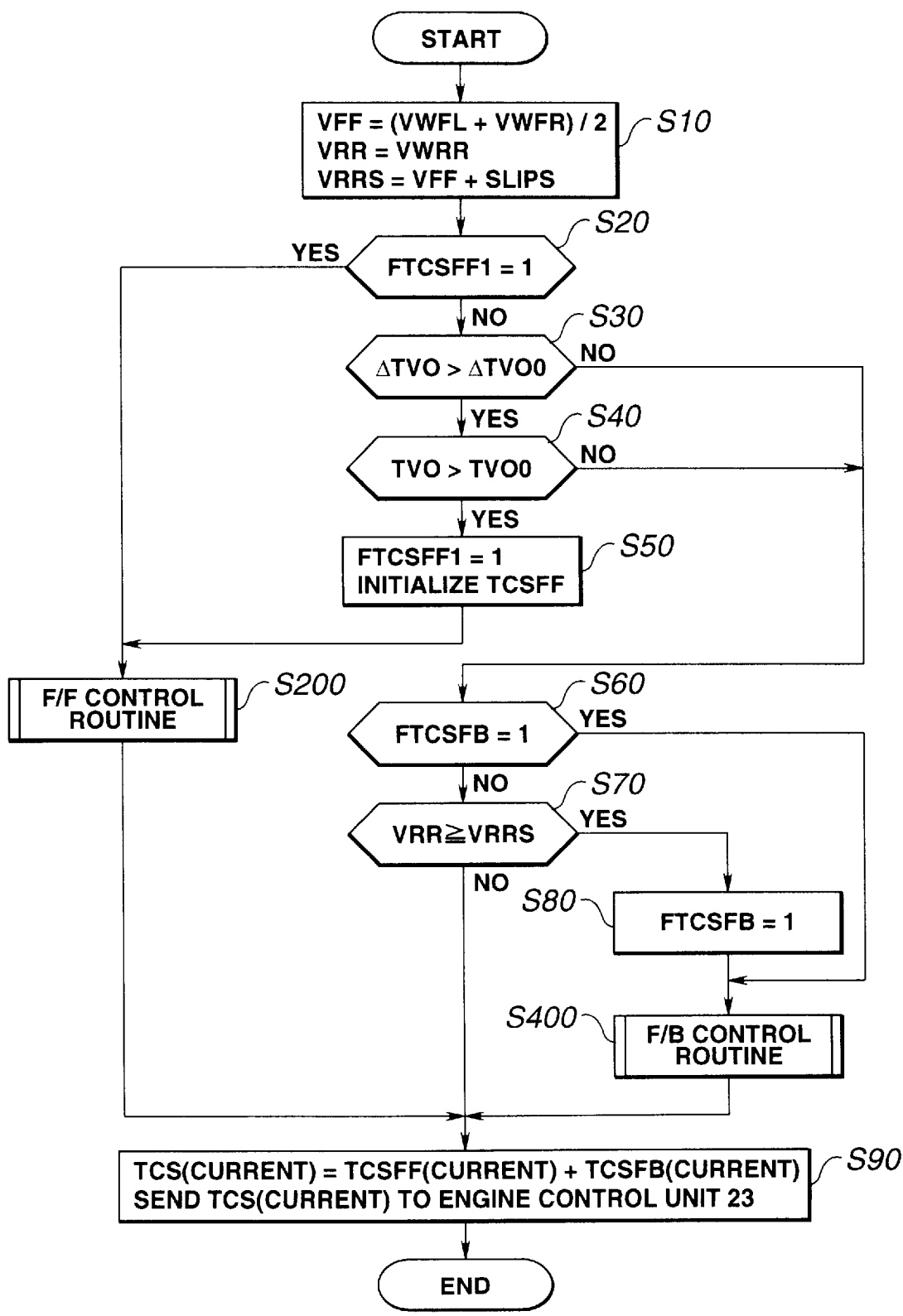
FIG. 9 is a flow chart showing a main control routine performed by a control system according to a second embodiment of the present invention.
Figure 10:
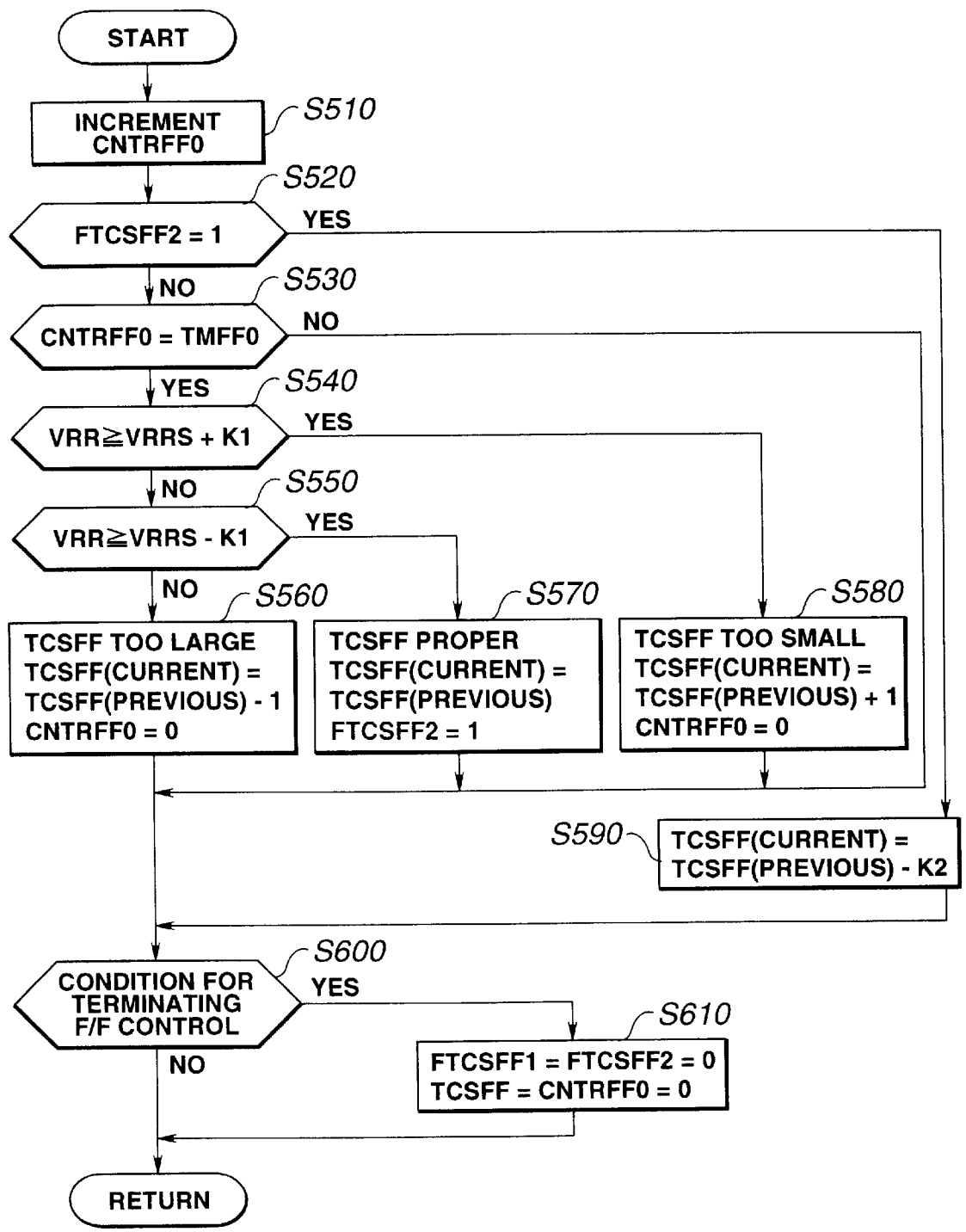
FIG. 10 is a flow chart showing an F/F control routine performed by the control system according to the second embodiment.
Figure 11:
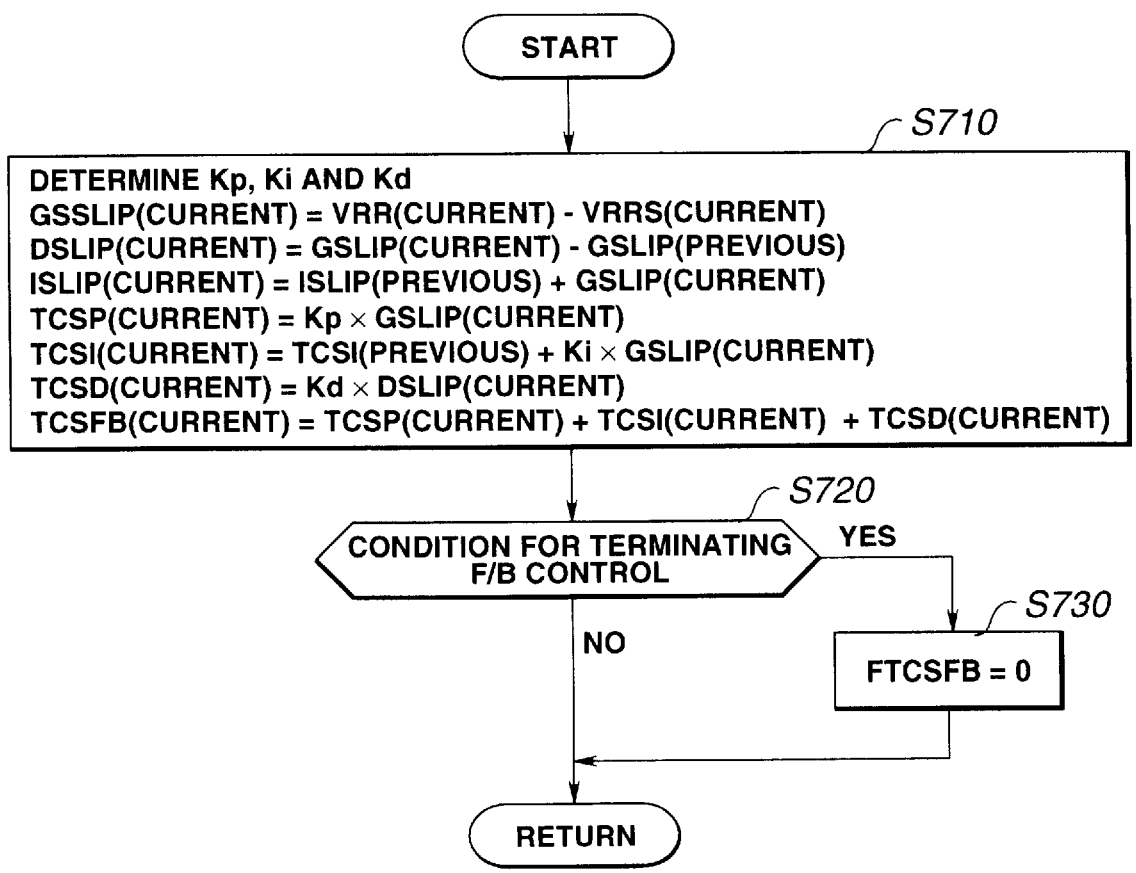
FIG. 11 is a flow chart showing a F/B control routine performed by the control system according to the second embodiment.

FIGS. 9, 10 and 11 show a control procedure performed by a control system according to a second embodiment of the present invention. The control system according to the second embodiment is almost identical to the control system of the first embodiment, but different in the following points.

FIG. 9 shows a main control routine which is different in a step S50 from the main control routine of FIG. 3.

Figures 13, 14:
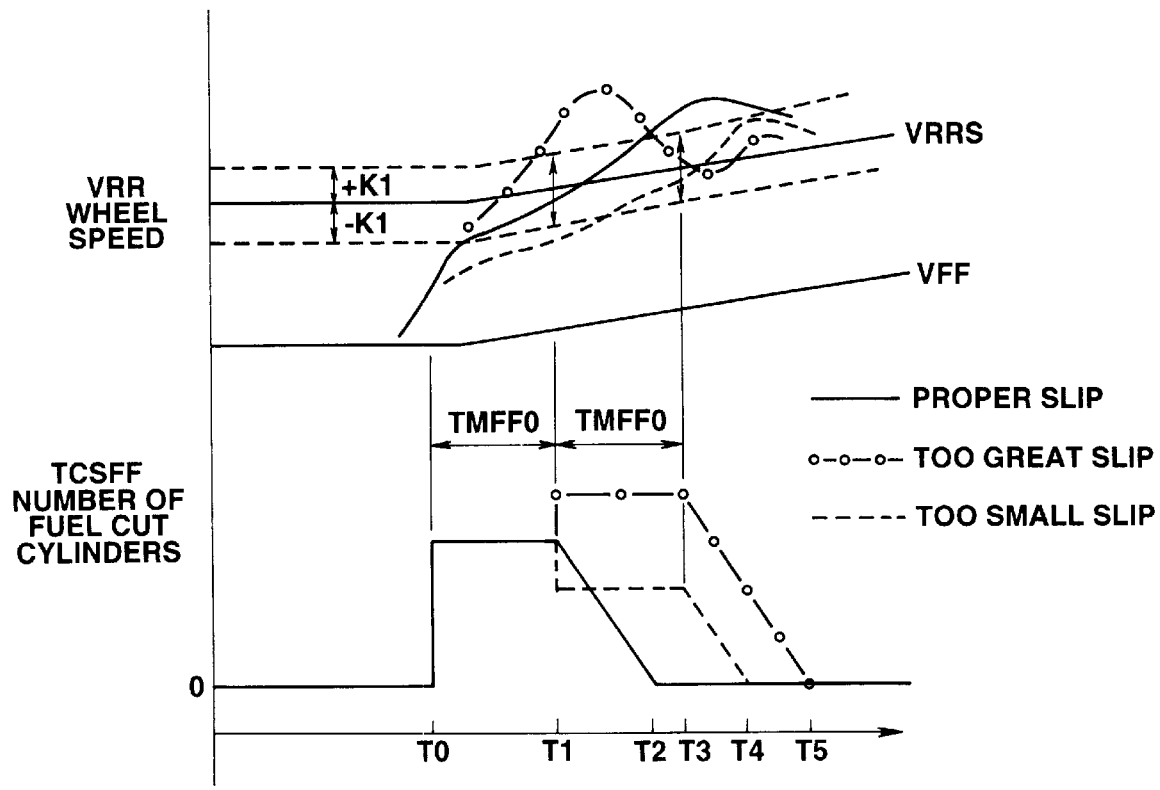
FIG. 13 is a time chart showing driving force reduction modifying operations performed by the control system according to the second embodiment.
FIG. 14 is a table showing a map representing initial values of the number of cutoff cylinders corresponding to values of the throttle opening degree, used by the control system according to the second embodiment.

At the step S50 in FIG. 9, the control system according to the second embodiment sets the acceleration prediction flag FTCSFF1 to one, and initially sets the cutoff number TCSFF to a value dependent on the throttle valve opening degree TVO according to a map shown in FIG. 14. The map is arranged to determine a value of the cutoff number TCSFF (0~A3) corresponding to a value of the throttle valve opening degree TVO. A1~A3 are constants, and 0%≦A1~A3≦100%.

FIG. 10 shows the F/F control routine of the step S200 shown in FIG. 9.

At a step S510, the control system increments (increases by one) the first counter CNTRFF0 (initially set equal to zero) in each control cycle to control a time starting from the start of the F/F control.

At a step S520 following the. step S510, the control system determines whether a proper slip detection flag FTCSFF2 is set at one, or not. Thus, the control system periodically checks whether or not the F/F control quantity in the form of the cutoff number TCSFF is proper and the drive wheel speed VRR is in a proper slipping condition. If the slip quantity is proper and the answer of the step S520 is YES (FTCSFF2=1), then the control system proceeds to a step S590, and decreases the cutoff number TCSFF by a predetermined quantity K2 so that the cutoff number TCSFF is decreased in such a stepwise manner that K2 is subtracted each time. Thereafter, the control system proceeds to a step S600. A decrease in the F/F control quantity in the form of the cutoff number TCSFF increases an acceleration slip, so that the F/B control quantity in the form of the cutoff number TCSFB is increased. Therefore, K2 is so determined as to compensate for a decrease in the F/F control quantity of the cutoff number TCSFF with an increase in the F/B control quantity of the cutoff number TCSFB.

If the slip quantity is not proper and the answer of the step S520 is negative (FTCSFF2=0), then the control system proceeds to a step S530, at which the control system checks the first counter CNTRFF0 to determine whether the predetermined time TMFF0 has passed from the start of the F/F control. If the answer is YES (CNTRFF0=TMFF0), then the control system proceeds to a step S540 which is a first step of a slip quantity judgment section. If the answer is NO (CNTRFF0<TMFF0), then the control system omits the slip quantity judgment section (S540~S580) and proceeds directly to a step S600.

In the slip judgment section of the steps S540~S580, in order to check whether the initially set F/F control quantity (the cutoff number TCSFF) is fit for the road surface friction coefficient $\mu$, or not, the control system compares the drive wheel speed VRR with the target drive wheel speed VRRS, and modifies the F/F control quantity (TCSFF).

At the step S540, the control system determines whether the drive wheel speed VRR is equal to or greater than a sum (VRRS+K1) resulting from addition to the target drive wheel speed VRRS, of a predetermined positive threshold value K1 (for example, K1=0.5 km/h). If it is, the control system considers that the slip quantity is too large, and proceeds to the step S580 for handling the case in which the F/F control quantity (TCSFF) is too small. At the step S580, the control system increases the cutoff number TCSFF by one, and resets the first counter CNTRFF0 to zero to check the slip quantity of the drive wheel speed VRR again after the elapse of the predetermined time TMFF0. Thereafter, the control. system proceeds to the step S600.

If the answer of the step S540 is NO, the control system proceeds to the step S550 and determines, at the step S550, whether the drive wheel speed VRR is equal to or higher than a difference (VRRS−K1) resulting from subtraction of the predetermined threshold value K1 from the target drive wheel speed VRRS. If the answer of the step S550 is YES (VRRS+K1≧VRR≧VRRS−K1), then the control system considers that the slip quantity is proper, and the drive wheel speed VRR is properly controlled around the target drive wheel speed VRRS, and proceeds to the step S570 for handling the case in which the F/F control quantity (TCSFF) is proper. At the step S570, the control system holds the cutoff number TCSFF unchanged, and equal to the previous (most recent) value, and sets the proper slip detection flag FTCSFF2 to one in order to omit the slip judgment section of the steps S530~S580 from the next control cycle and directly proceed to the step S590 to decrease the cutoff number TCSFF K2 by K2. Thereafter, the control system proceeds to the step S600.

If the answer of the step S550 is NO (VRR<VRRS−K1), then the control system considers that the slip quantity is too small, and proceeds to the step S560 for handling the case in which the F/F control quantity (TCSFF) is too large. At the step S560, the control system decreases the cutoff number TCSFF by one, and resets the first counter CNTRFF0 to zero to check the slip quantity of the drive wheel speed VRR again after the elapse of the predetermined time TMFF0. Thereafter, the control system proceeds to the step S600.

At the step S600, the control system determines whether a predetermined condition for terminating the F/F control is satisfied or not. In this example, the control system checks, at the step S600, whether the cutoff number TCSFF(current) is reduced to zero or less. If it is (TCSFF≦0), then the control system proceeds to a step S610, sets the acceleration slip prediction flag FTCSFF1, the proper slip detection flag FTCSFF2, the cutoff number TCSFF, and the first counter CNTRFF0 to zero at the step S610 to enable a new prediction of the acceleration slip from the next control cycle, and then returns to the step S10 of the main control routine shown in FIG. 9. If the answer of the step S600 is negative (NO), then the control system directly returns to the step S10 of the main control routine of FIG. 9.

FIG. 11 shows the F/B control routine of the step S400 shown in FIG. 9.

At a step S710 shown in FIG. 11, the control system determines the number TCSFB of fuel cut off cylinders for the F/B control according to a general proportional-plus-integral-plus-derivative control law.

Namely, the control system determines a proportional gain Kp, an integral gain Ki, and a derivative gain Kd from the initially set value, and then calculates a deviation GSLIP of the drive wheel speed VRR from the target drive wheel speed VRRS, a deviation difference DSLIP and a deviation integral ISLIP according to the following equations (9), (10) and (11). Furthermore, the control system calculates TCSP, TCSI and TCSD according to the following equations (12), (13) and (14). Finally, the control system calculates the cutoff number TCSFB according to the following equation (15).

$$GSLIP(\text{current})=VRR(\text{current})-VRRS(\text{current}) \qquad (9)$$

$$DSLIP(\text{current})=GSLIP(\text{current})-GSLIP(\text{previous}) \qquad (10)$$

$$ISLIP(\text{current})=ISLIP(\text{previous})+GSLIP(\text{current}) \qquad (11)$$

$$TCSP(\text{current})=Kp \times GSLIP(\text{current})(-100\% \leq TCSP(\text{current}) \leq +100\%) \qquad (12)$$

$$TCSI(\text{current})=TCSI(\text{previous})+Ki \times GSLIP(\text{current})(0\% \leq TCSI(\text{current}) \leq +100\%) \qquad (13)$$

$$TCSD(\text{current})=Kd \times DSLIP(\text{current})(-100\% \leq TCSD(\text{current}) \leq +100\%) \qquad (14)$$

$$TCSFB(\text{current})=TCSP(\text{current})+TCSI(\text{current})+TCSD(\text{current}) \qquad (15)$$

At a step S720 following the step S710, the control system determines whether the F/B control is over or not. In this example, the control system determines, at the step S720, whether, after an change from the state in which the cutoff number TCSFB(previous)≠0 to the state in which the TCSFB(current)=0, the state remains unchanged for a predetermined time. If the answer of the step S720 is YES, the control system considers the F/B control is over, proceeds to the step S730, resets the acceleration slip detection flag FTCFB to zero at the step S730, and returns to the step S10 of the main control routine shown in FIG. 9. In the case of NO, the control system directly returns to the step S10 of the main control routine.

Figure 12:
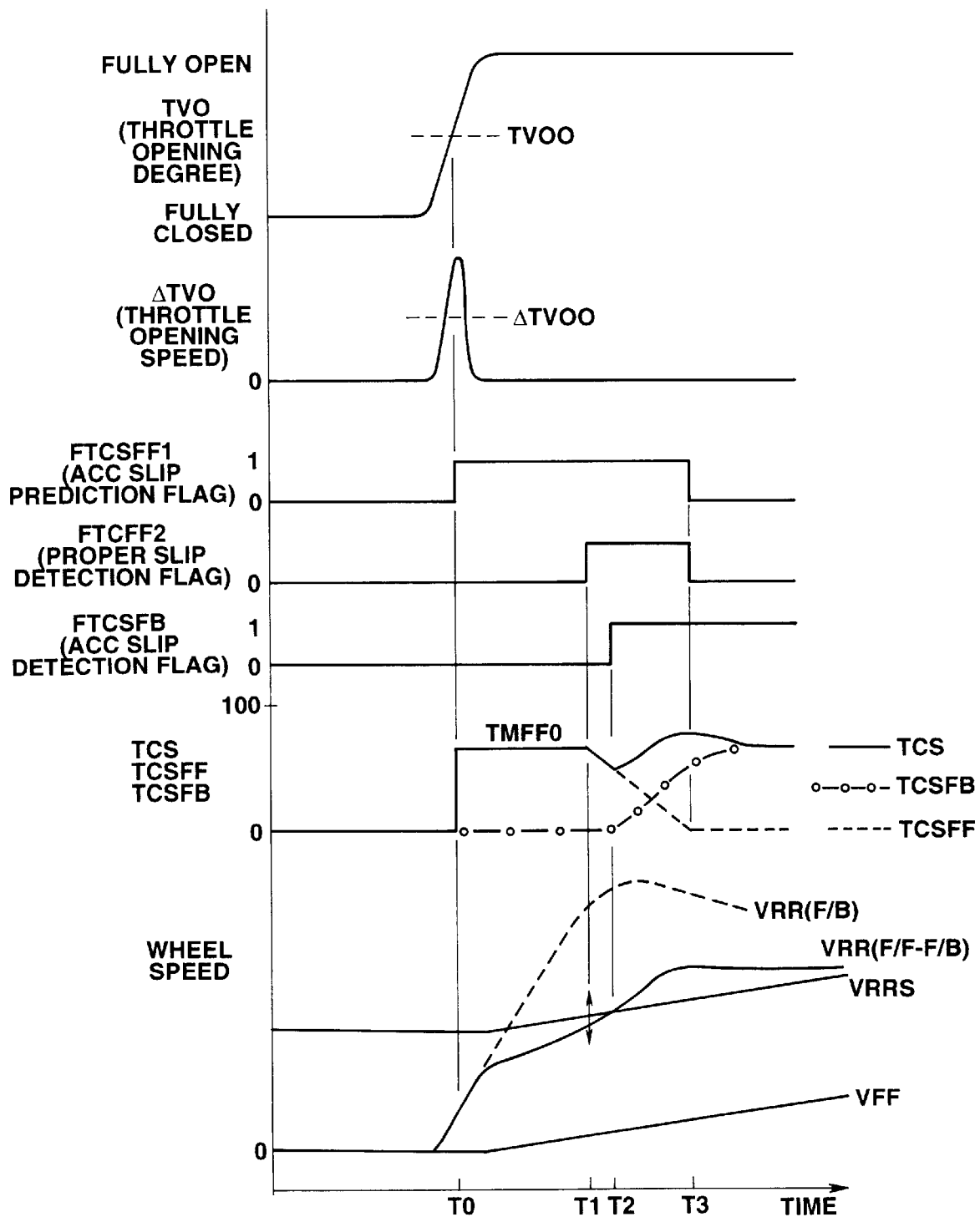
FIG. 12 is a time chart showing control operations of the control system according to the second embodiment.

The acceleration slip control unit 22 according to the second embodiment performs control operations as shown in FIGS. 12 and 13.

When, as shown in the time chart of FIG. 12, an occurrence of acceleration slip is predicted at an instant T0 from the throttle opening degree TVO and the throttle valve opening speed ΔTVO, the control unit 22 sets the acceleration slip prediction flag FTCSFF1 to one, and determines the initial value of the cutoff number TCSFF corresponding to the throttle valve opening degree TVO as shown in the map of FIG. 14.

At the end (instant T1) of the predetermined time TMFF0 from the start of the F/F control, the control unit 22 checks whether the slip condition is suitable to the road surface friction coefficient μ, and modifies the F/F control quantity in the form of the cutoff number TCSFF, in the manner shown in FIG. 13 and explained later.

In the example shown in FIG. 12, the drive wheel speed VRR is in the proper slip condition, and therefore, the control unit 22 sets the proper slip detection flag FTCSFF2 to one and decreases the cutoff number TCSFF by K2 each time. When the drive wheel speed VRR becomes equal to or higher than the target drive wheel speed VRRS (VRR≧VRRS)(at an instant T2), the control unit 22 sets the acceleration slip detection flag FTCSFB1 to one, and starts the F/B control. When the condition to terminate the F/F control is satisfied (at an instant T3), the control unit 22 sets the flags FTCSFF1 and FTCSFF2 to zero (FTCSFF1= FTCSFF2=0), and terminates the F/F control.

As a result, the drive wheel speed VRR varies so as to restrain an early stage acceleration slip as shown by a solid line under the influence of the F/F control, and finally converges to the target rear wheel speed VRRS under the influence of the F/B control. In the example omitting the F/F control and employing the F/B control only, the rear wheel speed VRR, as shown by a broken line, increases sharply, failing to restrain an early stage acceleration slip, so that convergence to the target rear wheel speed VRRS is delayed FIG. 13 shows operations and effects of the control system according to the second embodiment.

At the end T1 of the predetermined time TMFF0, the control system judges whether the cutoff number TCSFF initially set at the instant T0 is adapted to the road surface friction coefficient μ. When it is fit to μ as shown by a solid line, and the drive wheel speed VRR is in the range of VRRS±K1, the vehicle is in the condition capable of providing an adequate acceleration while restraining an acceleration slip, and therefore, the control system decreases the cutoff number TCSFF by the predetermined amount K2 each time, and terminates the F/F control at the instant T2.

If the cutoff number TCSFF initially set at the instant T0 is deficient as compared with the road surface friction coefficient μ, as shown by a broken line, the drive wheel speed VRR becomes equal to or greater than the upper limit VRRS+K1, resulting in an excessive acceleration slip. Therefore, the control system increases the cutoff number TCSFF by one (cylinder). After that, at the instant T3 at which the time TMFF0 expires, the control system further judges whether the F/F control quantity is fit to the friction coefficient μ. If it is fit, the control system decreases the cutoff number TCSFF stepwise by the predetermined amount K2 each time, and terminates the F/F control at an instant T5.

If the cutoff number TCSFF initially set at the instant T0 is excessive as compared with the road surface friction coefficient μ, as shown by a one dot chain line, the drive wheel speed VRR becomes lower than the lower limit VRRS−K1, and the acceleration slip becomes too small. Therefore, the control system decreases the cutoff number TCSFF by one. After that, at the end T3 of the time TMFF0, the control system further judges whether the F/F control quantity is fit to the friction coefficient μ. If it is fit, the control system decreases the cutoff number TCSFF K2 by K2, and terminates the F/F control at an instant T4.

With such a modification of the cutoff number TCSFF, the control system according to the second embodiment can eliminate excess and deficiency in acceleration slip after the instant T3, as shown by the broken line or one dot chain line. If, however, the F/F control terminates at T2 with no modification at T1, the excess of the acceleration slip could be increased in the case of the one dot chain line, and an early stage acceleration slip could occur despite elimination of the deficiency in acceleration in the case of the broken line.

As explained above, the second embodiment can off the same effects as the first embodimerit.

Figure 15:
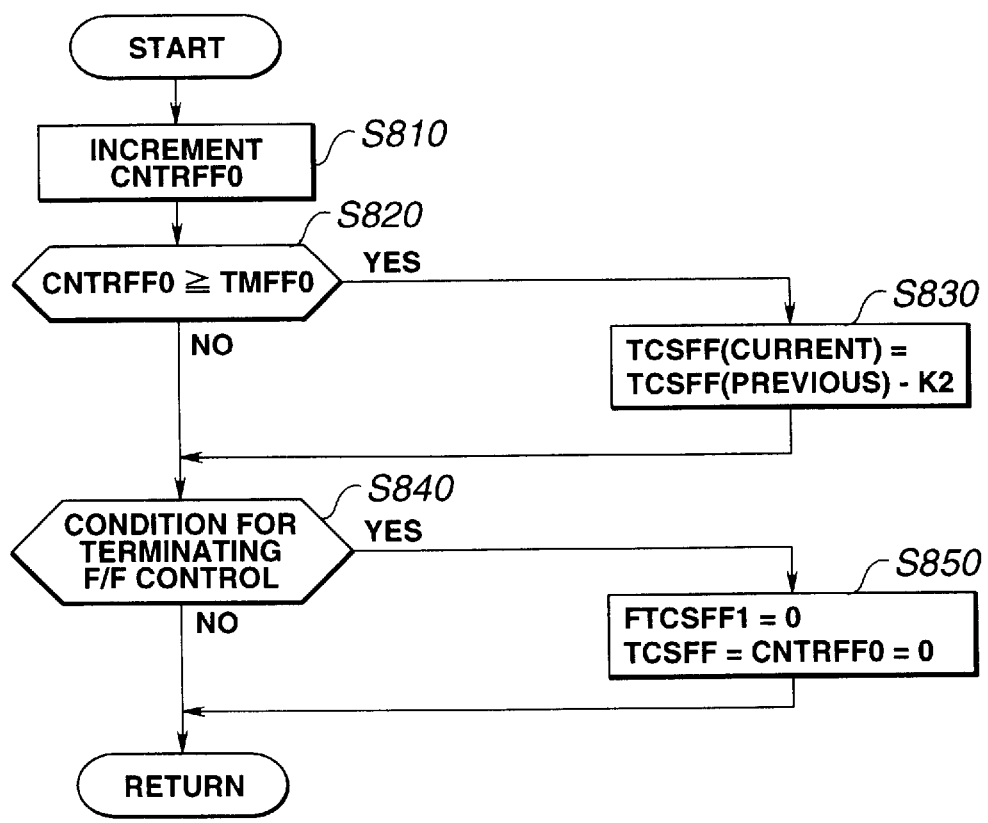
FIG. 15 is a flow chart showing an F/F control routine performed by a control system according to a third embodiment of the present invention.

FIG. 15 shows a control procedure performed by a control system according to a third embodiment of the present invention. The control system according to the third embodiment is almost identical to the control system of the second embodiment, but different in the F/F control routine from the second embodiment. The F/F control routine according to the third embodiment omits the operation for modifying the initially set cutoff number TCSFF according to the judgment of the actual slip condition.

FIG. 15 shows the F/F control routine according to the third embodiment.

At a step S810 shown in FIG. 15, the control system increments (increases by one) the first counter CNTRFF0 (initially set equal to zero) in each control cycle to control a time starting from the start of the F/F control.

At a step S820 following the step S810, the control system checks the first counter CNTRFF0 to determine whether the predetermined time TMFF0 has passed from the start of the F/F control. If the answer is YES (CNTRFF0≧TMFF0), then the control system proceeds to a step S830, decreases the F/F control quantity in the form of the cutoff number TCSFF by the predetermined amount K2 each time at the step S830, and then proceeds to a step S840. If the answer of the step S820 is NO (CNTEFF0<TMFF0), then the control system directly proceeds to the step S840.

At the step S840, the control system determines whether the predetermined condition for terminating the F/F control is satisfied or not. In this example, the control system checks, at the step S840, whether the cutoff number TCSFF (current) is reduced to a value equal to or smaller than zero. If it is (TCSFF≦0), then the control system proceeds to a step S850, resets the acceleration slip prediction flag FTCSFF1, the cutoff number TCSFF, and the first counter CNTRFF0 to zero at the step S850 to enable a new prediction of the acceleration slip from the next control cycle, and then returns to the step S10 of the main control routine shown in FIG. 9. If the answer of the step S840 is negative (NO), then the control system directly returns to the step S10 of the main control routine of FIG. 9.

In the third embodiment, the modification of the F/F control quantity in the form of the cutoff number TCSFF according to the judgment of the actual slip condition is omitted, so that the third embodiment is inferior in performance to the first and second embodiments. However, by initially setting the F/F control quantity (TCSFF) in accordance with the throttle valve opening degree TVO, independent of the engine rotational speed, the control system according to the third embodiment can restrain an slip in an early stage of acceleration even in starting from a rest, sufficiently without causing acceleration deficiency or acceleration slip restraint deficiency.

Figure 16:
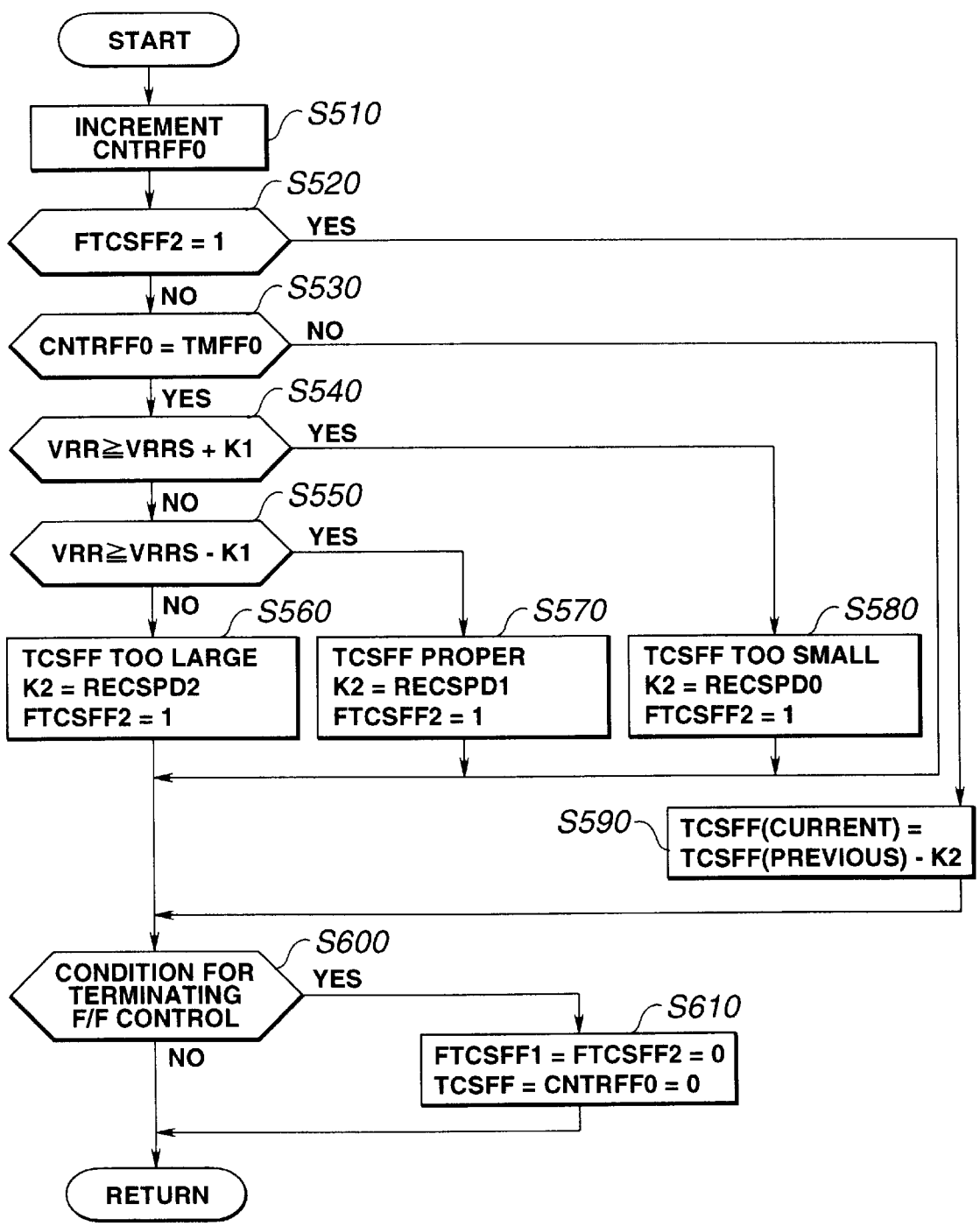
FIG. 16 is a flow chart showing an F/F control routine performed by a control system according to a fourth embodiment.

FIG. 16 shows a control procedure performed by a control system according to a fourth embodiment of the present invention. The control system according to the fourth embodiment is almost identical to the control system of the second embodiment, but different in the F/F control routine from the second embodiment. The F/F control routine according to the fourth embodiment is different in the modification section of steps S560~S580 from therF/F control routine of the second embodiment.

FIG. 16 shows the F/F control routine according to the fourth embodiment.

At the step S580 of FIG. 16 for handling the case in which the F/F control quantity (TCSFF) is too small, the control system according to the fourth embodiment sets the decrease quantity K2 to a minimum value RECSPD0 to maintain the initial value of the cutoff number TCSFF long, and resets the proper slip detection flag FTCFF2 to one to decrease the cutoff number TCSFF from the next control cycle.

At the step S570 of FIG. 16 for handling the case in which the F/F control quantity (TCSFF) is proper, the control system according to the fourth embodiment sets the decrease quantity K2 to a standard value RECSPD1 to hold the initial value of the cutoff number TCSFF properly, and resets the proper slip detection flag FTCFF2 to one to decrease the cutoff number TCSFF from the next control cycle.

At the step S560 of FIG. 16 for handling the case in which the F/F control quantity (TCSFF) is too great, the control system according to the fourth embodiment sets the decrease quantity K2 to a maximum value RECSPD2 to decrease the cutoff number TCSFF more rapidly from the initial value, and resets the proper slip detection flag FTCFF2 to one to decrease the cutoff number TCSFF from the next control cycle.

Thus, the control system according to the fourth embodiment varies the rate of decrease (or the decreasing speed) by varying the decrease quantity K2 of the F/F control quantity (TCSFF) after the elapse of the time TMFF0, and modifies the initial value of the F/F control. Therefore, the fourth embodiment can offer effects similar to the effects of the second embodiment.

The present invention is not limited to these four embodiments. In the preceding embodiments, the driving force reducing means is in the form a fuel cutting means for cutting off the supply of fuel to one or more of the cylinders of the engine. However, instead of, or in addition to, the fuel cutting means, the driving force reducing means may comprise at least one of an ignition retarding means for retarding the ignition timing of the engine, a means for braking the driving wheels and a sub-throttle valve controlling means for controlling the opening degree of a sub-throttle valve provided on the upstream side of the main throttle valve for the engine.

Figure 17:
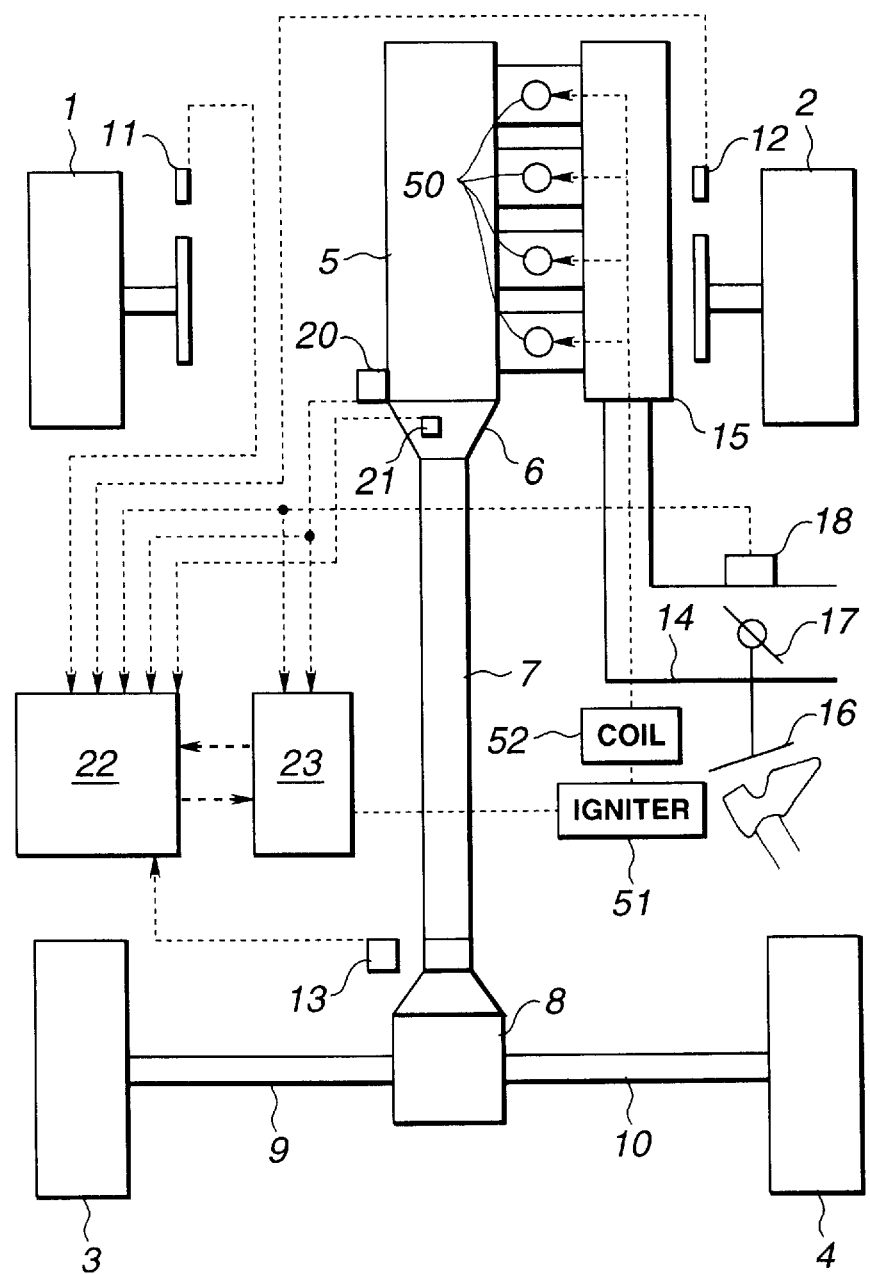
FIG. 17 is a schematic view showing a vehicle acceleration slip control system according to a fifth embodiment of the present invention.

FIG. 17 shows a vehicle acceleration slip control system according to a fifth embodiment of the present invention which is arranged to reduce the vehicle driving force by retarding the ignition timing of the engine 5. The engine control unit 23 stores a collection of optimum ignition timing data determined in accordance with the engine speed and the basic fuel injection quantity. The engine control unit 23 determines the optimum ignition timing in accordance with the engine speed sensed by the engine speed sensor 20 and the basic fuel injection quantity, and ignites the fuel mixture with each spark plug 50 through an igniter 51 and a coil 52. The acceleration slip control system of this embodiment modifies the thus-determined optimum ignition timing in accordance with an acceleration slip. The control procedure according to this embodiment is substantially the same as that of the first embodiment. In the step S310 in FIG. 4, however, the control system according to the fifth embodiment employs the equation, TCSFF=TCSFF−TCSFFD. That is, the control system decreases the F/F control quantity in the form of the ignition retardation (TCSFF) by the retardation decrease quantity TCSFFD each time the step S310 is reached. It is possible to make the retardation decrease quantity TCSFFD variable in dependence on the road surface friction coefficient $\mu$. At the step S50 of FIG. 3, and the steps S260~S280, the control system sets the retardation decrease quantity TCSFFD to a value TCSFFD($\mu$) corresponding to the friction coefficient $\mu$. The control system of the fifth embodiment performs the feedback control substantially in the same manner as in the first embodiment.

Figure 18:
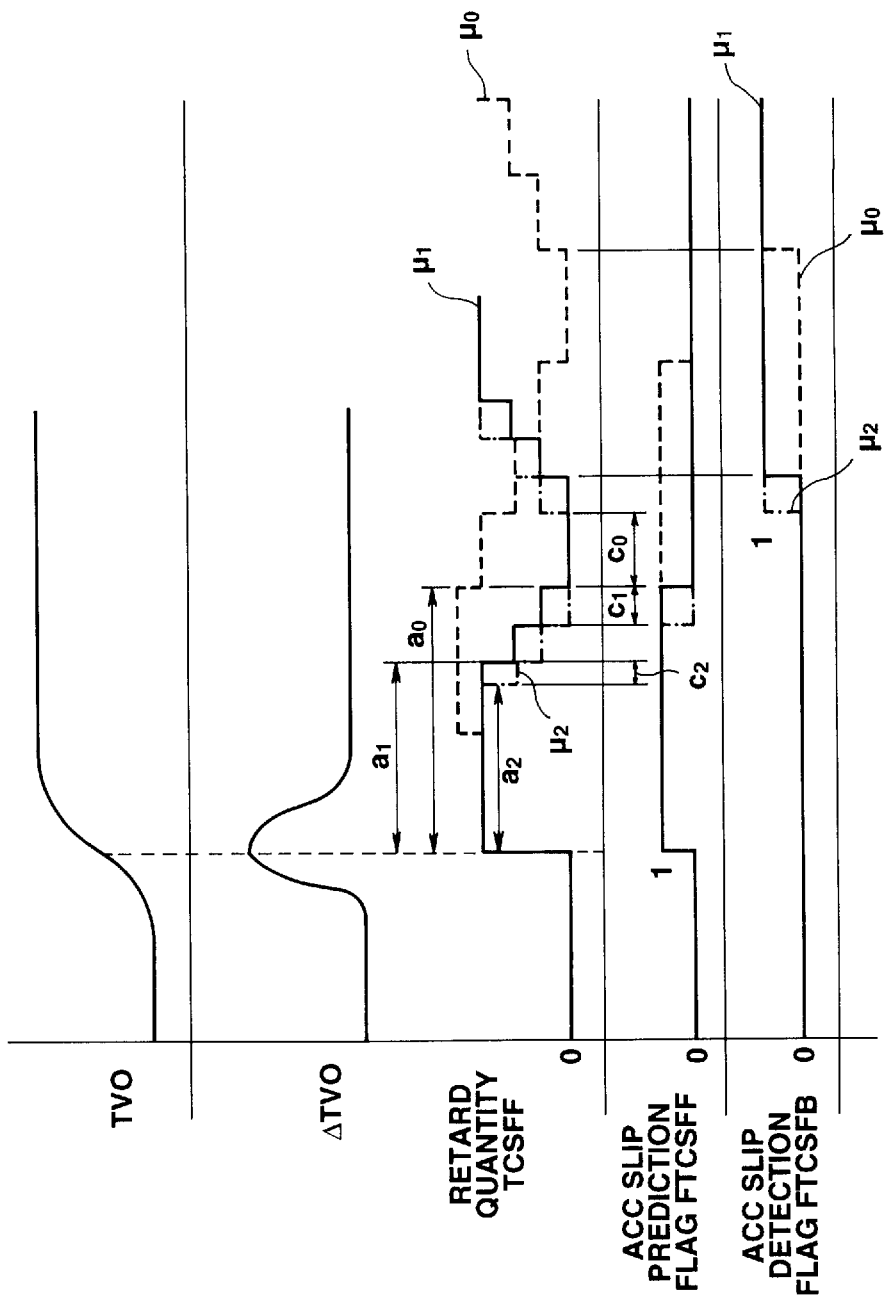
FIG. 18 is a time chart showing control operations of the control system according to the fifth embodiment.

When the throttle valve opening speed $\Delta$TVO is equal to or higher than the predetermined threshold speed $\Delta$TVO0, and the throttle valve opening degree TVO is equal to or greater than the predetermined threshold degree TVO0, the control system increases the F/F control quantity, that is the ignition retard quantity TCSFF to preliminarily reduce the driving force of the engine 5 before an actual occurrence of an acceleration slip, and at the same time, sets the acceleration prediction flag FTCSFF to one, as shown in FIG. 18.

When the predetermined time TMFF0 has passed since the start of the F/F control, the control system modifies the initially set ignition retard quantity TCSFF, and determines the duration time TMFF1 and the subtraction interval time TMFF2 as in the first embodiment. In FIG. 18, the duration time TMFF1 is equal to a0 in the case of $\mu$0, a1 in the case of $\mu$1, and a2 in the case of $\mu$2, and the subtraction interval time TMFF2 is set equal to c0, c1 or c2 according to the friction coefficient $\mu$.

Figure 19:
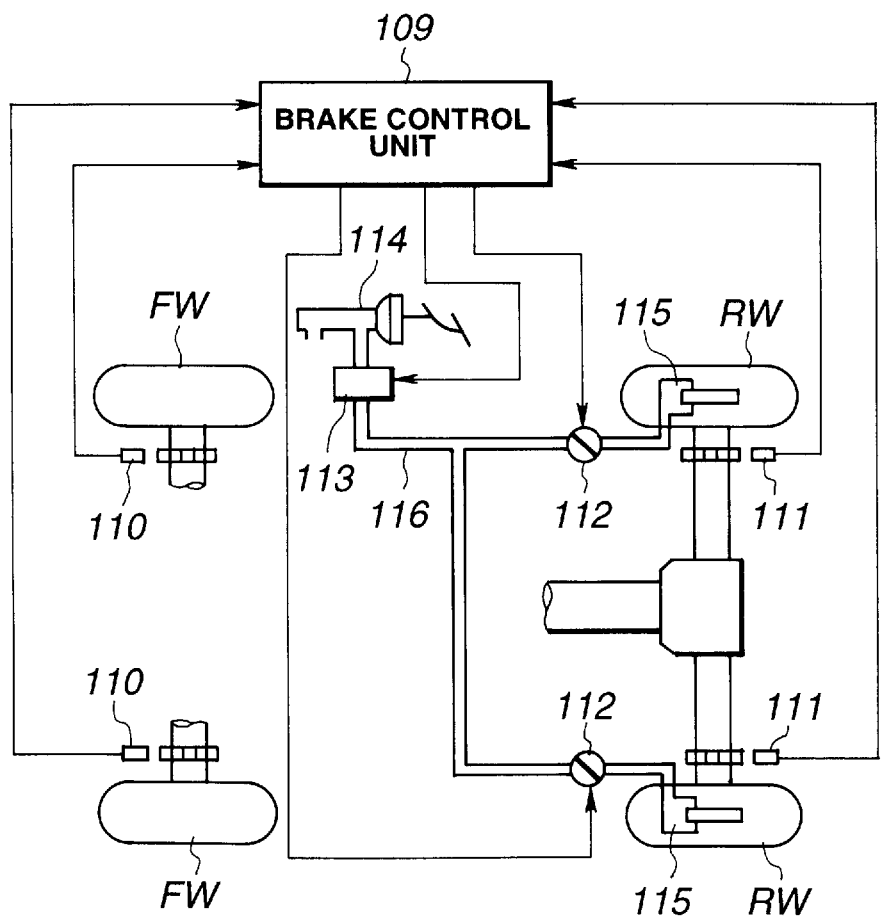
FIG. 19 is a schematic view showing a brake system which can be used in a vehicle acceleration slip control system according to a sixth embodiment of the present invention.
Figure 20:
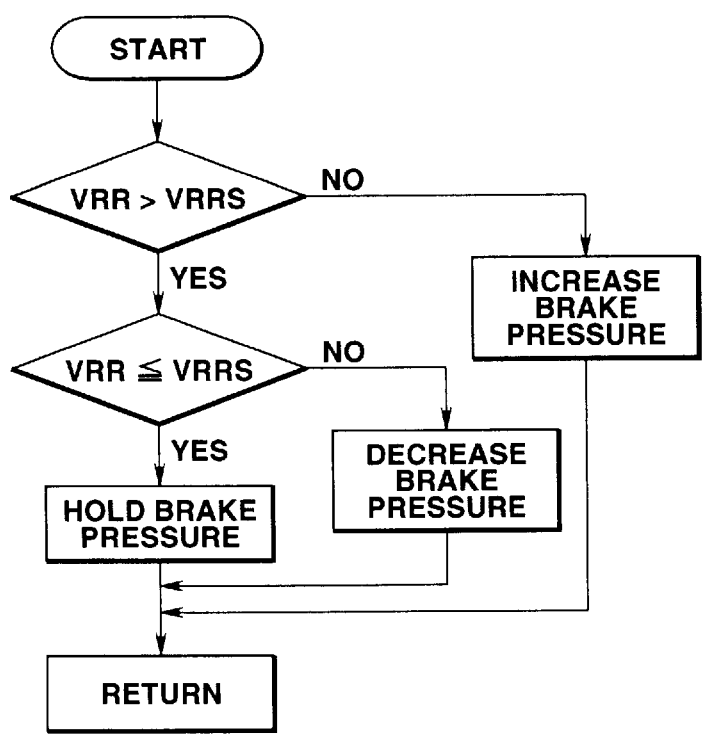
FIG. 20 is a flow chart showing a feed back control procedure performed by the control system according to the sixth embodiment.

FIG. 19 shows a brake system which can be used in a vehicle acceleration slip control system according to a sixth embodiment of the present invention which is arranged to decrease the vehicle driving force by varying the braking force of the vehicle drive wheels. This brake system has a brake control unit 109 for the acceleration slip control, connected with wheel speed sensors 110 and 111, a master cylinder 114, a brake fluid pressure control pump 113, left and right brake fluid pressure control valves 112, left and right rear wheel brake actuators 115 connected, respectively, with the left and right control valves 112, which are in turn connected with the pump 113 through a passage 116. The acceleration slip control unit according to the sixth embodiment performs the basic control routine and the F/F control routine substantially identical to those of the first embodiment, and sends the command signal to the brake control system to control the drive wheel slippage. In this embodiment, the F/F control quantity TCSFF is an increase quantity of the brake fluid pressure, and TMFF1 is a hold time. In the sixth embodiment, TMFF2 is omitted. Accordingly, the steps S300~S320 in FIG. 4 are eliminated in the sixth embodiment. FIG. 20 shows a feed back control procedure which can be used in the sixth embodiment. By comparing the drive wheel speed VRR with the desired value VRRS, the control system increases, decreases or holds the brake fluid pressure.

Figure 21:
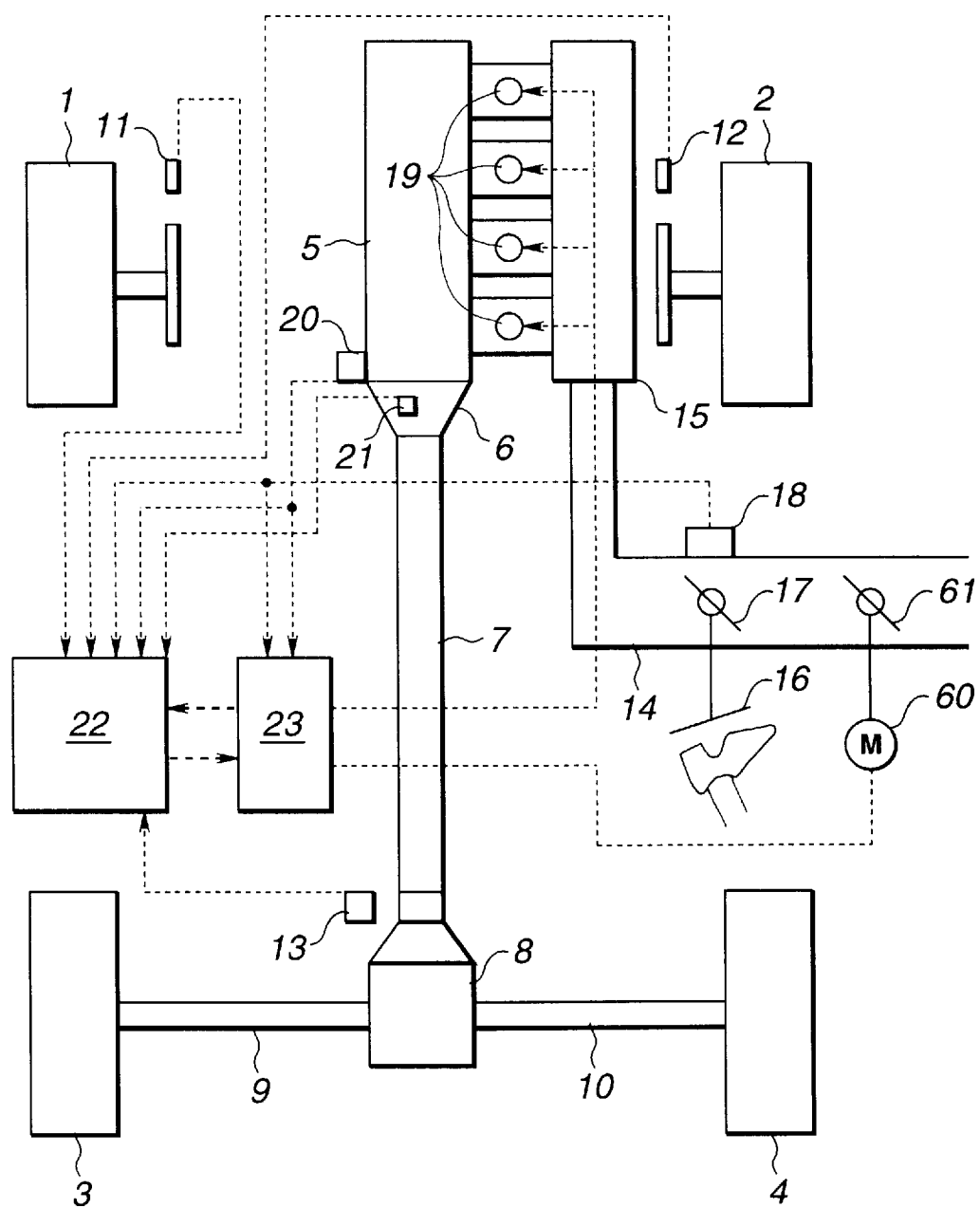
FIG. 21 is a schematic view showing a vehicle acceleration slip control system according to a seventh embodiment of the present invention.
Figure 22:
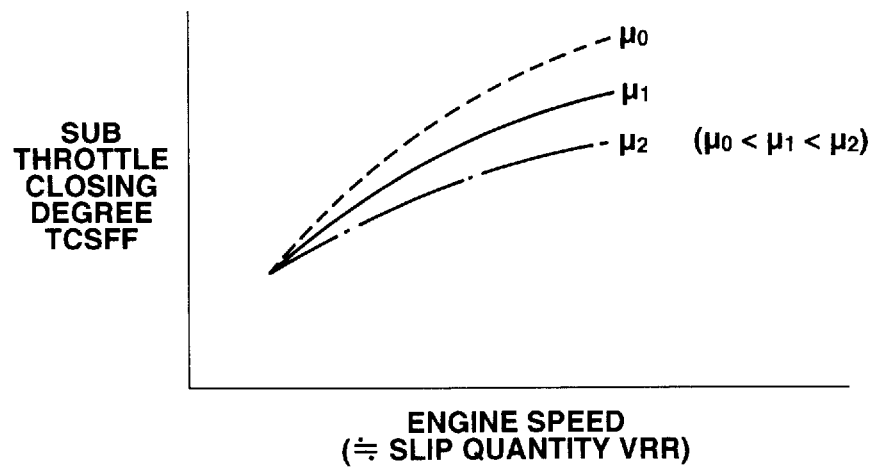
FIG. 22 is a graph showing characteristics of a sub-throttle valve closing degree used in the control system according to the seventh embodiment.

FIG. 21 shows a vehicle acceleration slip control system according to a seventh embodiment which is arranged to control the vehicle driving force by controlling a subordinate (or secondary) throttle valve 61. The sub-throttle valve 61 is disposed in the intake passage 14 on the upstream side of the main throttle valve 17, and connected with a drive motor 60. The engine control unit 23 controls the closing degree of the sub throttle valve 61 by sending a signal to the motor 60. In this embodiment, the opening degree of the sub throttle valve 61 is determined as shown in FIG. 22, and the control system controls the sub throttle valve opening degree substantially in the same manner as in the first embodiment. In this embodiment, the F/F control quantity TCSFF is the closing degree of the sub throttle valve 61. This control system uses the duration TMFF1 and the interval TMFF2 as in the first embodiment. At the step S50 of FIG. 3, the control system of the seventh embodiment sets a decrease quantity TCSFFSD($\mu$) of the sub throttle valve closing degree, and the step S310 of FIG. 4 employs the following equation. TCSFF=TCSFF−TCSFFSD($\mu$). In this embodiment, the control of the sub throttle valve. 61 affects the intake air quantity, and therefore, the control system is arranged to adjust the fuel injection quantity in accordance with the closing degree of the sub throttle valve.

According to the illustrated embodiments of the invention, a control system comprises a drive wheel slipping condition sensing means (11, 12, 13) for sensing a drive wheel slipping condition (such as VRR−VFF) of a vehicle; a throttle condition sensing means (18) for sensing a throttle condition (TVO, ΔTVO) of a throttle valve (17) of an engine (5); a first condition discriminating means (S70) for producing a first condition signal (such as FTCSFB) indicating an occurrence of a drive wheel acceleration slip by checking the drive wheel slipping condition or by comparing the drive wheel slipping condition with a first reference level (such as SLIPS); a second condition discriminating means (S30, S40) for producing a second condition signal (such as FTCSFF) indicating a prediction of a drive wheel acceleration slip by checking the throttle condition (TVO, ΔTVO) or by comparing the throttle condition with a second reference level (TVO0, ΔTVO0), a first controlling (or feed back controlling) means (S400) for controlling a driving torque of the vehicle in a first control mode when the first condition signal is present, and a second controlling (or feed forward controlling) means (S200) for controlling the driving torque of the vehicle in a second control mode when the second condition signal is present. In the illustrated embodiments, the first controlling means controls a first driving force reduction control quantity (TCSFB) in a feed back control manner so as to reduce a deviation of the drive wheel speed (VRR) from a desired drive wheel speed (VRRS), and the second controlling means increases a second driving force reduction control quantity (TCSFF) to an initially set value (A1, A2, A3) in response to the second condition signal, in a feed forward control manner independent of the deviation of the actual drive wheel speed from the desired drive wheel speed. For example, the initial set value (A1, A2, A3) is determined in accordance with the throttle condition. For example, the initial set value may be made higher as the throttle valve opening degree becomes greater.

The second controlling means may comprise a modifying means for varying the second driving force reduction control quantity (TCSFF) from the initially set value, in accordance with the drive wheel slipping condition sensed by the drive wheel slipping condition sensing means.

What is claimed is:

1. A vehicle acceleration slip control system comprising:
   a means for sensing a drive wheel speed of a vehicle;
   a means for sensing a non-drive wheel speed of the vehicle;
   an acceleration slip detecting means for detecting a drive wheel acceleration slip condition by comparing the drive wheel speed sensed by the drive wheel speed sensing means and the non-drive wheel speed sensed by the non-drive wheel speed sensing means;
   a driving force reducing means for reducing a driving force of the vehicle;
   an acceleration slip controlling means for performing a feedback control to control a driving force reduction quantity by commanding the driving force reducing means to restrain an acceleration slip when the acceleration slip detecting means detects the acceleration slip condition;
   an acceleration slip predicting means for predicting an occurrence of a drive wheel acceleration slip of the vehicle;
   a prediction controlling means for performing a feedforward control to prevent an occurrence of an acceleration slip by sending a command signal indicating an initial value of the driving force reduction quantity to said driving force reducing means when an occurrence of an acceleration slip is predicted by said acceleration slip predicting means, said initial value being a starting value used at a start of the feedforward control; and
   a driving force reduction modifying means for modifying said initial value of said driving force reduction quantity in accordance with the acceleration slip condition sensed by said acceleration slip detection means during the prediction control of said prediction controlling means.

2. A vehicle acceleration slip control system as recited in claim 1 wherein said control system further comprises a means for sensing a throttle valve opening degree, and said prediction controlling means includes a means for determining said initial value of said driving force reduction quantity in accordance with said throttle valve opening degree sensed by said throttle valve opening degree sensing means.

3. A vehicle acceleration slip control system as recited in claim 2 wherein said acceleration slip predicting means comprises a judging means for judging an occurrence of an acceleration slip when the throttle valve opening degree is greater than a predetermined threshold opening degree and a throttle valve opening speed is greater than a predetermined opening speed.

4. A vehicle acceleration slip control system as recited in claim 2 wherein said driving force reducing means comprises a fuel cut means for cutting off a supply of fuel to at least one of cylinders of an engine of the vehicle.

5. A vehicle acceleration slip control system as recited in claim 2 wherein said driving force reducing means comprises an ignition retarding means for retarding an ignition timing of an engine of the vehicle.

6. A vehicle acceleration slip control system as recited in claim 2 wherein said driving force reducing means comprises a braking means for braking a drive wheel of the vehicle.

7. A vehicle acceleration slip control system as recited in claim 2 wherein said driving force reducing means comprises a secondary throttle valve controlling means for reducing the driving force by closing a secondary throttle valve provided in an intake air passage of the engine on a downstream side of a main throttle valve of the engine.

8. A vehicle acceleration slip control system as recited in claim 2 wherein the driving force reducing unit comprises a secondary throttle valve controller configured to reduce the driving force by closing a secondary throttle valve provided in an intake air passage of the engine on a downstream side of a main throttle valve of the engine.

9. A vehicle acceleration slip control system as recited in claim 1 wherein said prediction controlling means comprises a means for reducing the driving force reduction quantity stepwise by a predetermined amount each time from an end of a predetermined time from a start of the prediction control of said prediction controlling means.

10. A vehicle acceleration slip control system as recited in claim 9 wherein said driving force reduction modifying means includes a means for decreasing said driving force reduction quantity from said initial value at a rate of decrease which is varied in accordance with the drive wheel acceleration slip condition sensed by said acceleration slip detecting means.

11. A control system comprising:
a wheel speed sensor group for sensing a drive wheel slipping condition of a vehicle;
a throttle sensor for sensing a throttle condition of a throttle valve of an engine; and
a controller for producing a first condition signal indicating an occurrence of a drive wheel acceleration slip by monitoring the driving wheel slipping condition, for producing a second condition signal indicating a prediction of a drive wheel acceleration slip by monitoring the throttle condition, for controlling a driving torque of the vehicle in a first control mode when the first condition signal is present and for controlling the driving torque of the vehicle in a second control mode when the second condition signal is present, the controller being configured to reduce the driving torque of the vehicle by a second mode reduction control quantity set to an initial value in response to the second condition signal and to vary the second mode reduction control quantity from the initial value in accordance with the drive wheel slipping condition.

12. The control system as recited in claim 11 wherein the controller is configured to produce the first condition signal by comparing the driving wheel slipping condition with a first reference level, to produce the second condition signal by comparing the throttle condition with a second reference level, to start a feedback control in response to the first condition signal by controlling a first mode reduction control quantity in a feedback control manner to reduce a deviation of an actual drive wheel speed from a desired drive wheel speed, and to start a feedforward control in response to the second condition signal by reducing the driving force of the vehicle by the second mode reduction control quantity set to the initial value in a feedforward control manner independent of the deviation of the actual drive wheel speed from the desired drive wheel speed.

13. The control system as recited in claim 12 wherein the controller is configured to determine the initial value in accordance with the throttle condition so that the initial value is made higher as a throttle valve opening degree increases, and to vary the second mode reduction control quantity from the initial value in accordance with the drive wheel slipping condition.

14. A vehicle acceleration slip control system comprising:
a first sensor configured to sense a drive wheel speed of a vehicle;
a second sensor configured to sense a non-drive wheel speed of the vehicle;
an acceleration slip detector communicatively coupled to the first and second sensors and configured to detect a drive wheel acceleration slip condition by comparing the drive wheel speed sensed by the first sensor and the non-drive wheel speed sensed by the second sensor;
a driving force reducing unit configured to reduce a driving force of the vehicle;
an acceleration slip controller communicatively coupled to the acceleration slip detector and the drive force reducing unit, the acceleration slip controller configured to perform a feedback control to control a driving force reduction quantity by commanding the driving force reducing unit to restrain an acceleration slip when the acceleration slip detector detects the acceleration slip condition;
an acceleration slip predictor configured to predict an occurrence of a drive wheel acceleration slip of the vehicle;
a prediction controller communicatively coupled to the acceleration slip predictor and the driving force reducing unit, the prediction controller configured to perform a feedforward control to prevent an occurrence of an acceleration slip by sending a command signal indicating an initial value of the driving force reduction quantity to the driving force reducing unit when an occurrence of an acceleration slip is predicted by the acceleration slip predictor, the initial value being a starting value used at a start of the feedforward control; and
a driving force reduction modifying unit communicatively coupled to the acceleration slip condition detector and the prediction controller, the driving force reduction modifying unit configured to modifying the initial value of the driving force reduction quantity in accordance with the acceleration slip condition sensed by the acceleration slip detector during the prediction control of the prediction controller.

15. A vehicle acceleration slip control system as recited in claim 14 wherein the control system further comprises a third sensor configured to sense a throttle valve opening degree, and the prediction controller includes a determining unit configured to determine the initial value of the driving force reduction quantity in accordance with the throttle valve opening degree sensed by the third sensor.

16. A vehicle acceleration slip control system as recited in claim 15 wherein the acceleration slip predictor comprises a judging unit configured to judge an occurrence of an acceleration slip when the throttle valve opening degree is greater than a predetermined threshold opening degree and a throttle valve opening speed is greater than a predetermined opening speed.

17. A vehicle acceleration slip control system as recited in claim 15 wherein the driving force reducing unit comprises a fuel cut unit configured to cut off a supply of fuel to at least one of cylinders of an engine of the vehicle.

18. A vehicle acceleration slip control system as recited in claim 15 wherein the driving force reducing unit comprises an ignition retarder configured to retard an ignition timing of an engine of the vehicle.

19. A vehicle acceleration slip control system as recited in claim 14 wherein the prediction controller comprises a reduction unit configured to reduce the driving force reduction quantity stepwise by a predetermined amount each time from an end of a predetermined time from a start of the prediction control of the prediction controller.

20. A vehicle acceleration slip control system as recited in claim 19 wherein the driving force reduction modifying unit includes a decreasing unit configured to decrease the driving force reduction quantity from the initial value at a rate of decrease which is varied in accordance with the drive wheel acceleration slip condition sensed by the acceleration slip detector.

* * * * *